Jan. 27, 1970     D. M. DUFT ET AL     3,492,433
EQUIPMENT FOR AUTOMATICALLY RETRYING CUSTOMER-DIALED CALLS
Filed July 20, 1966     17 Sheets-Sheet 5

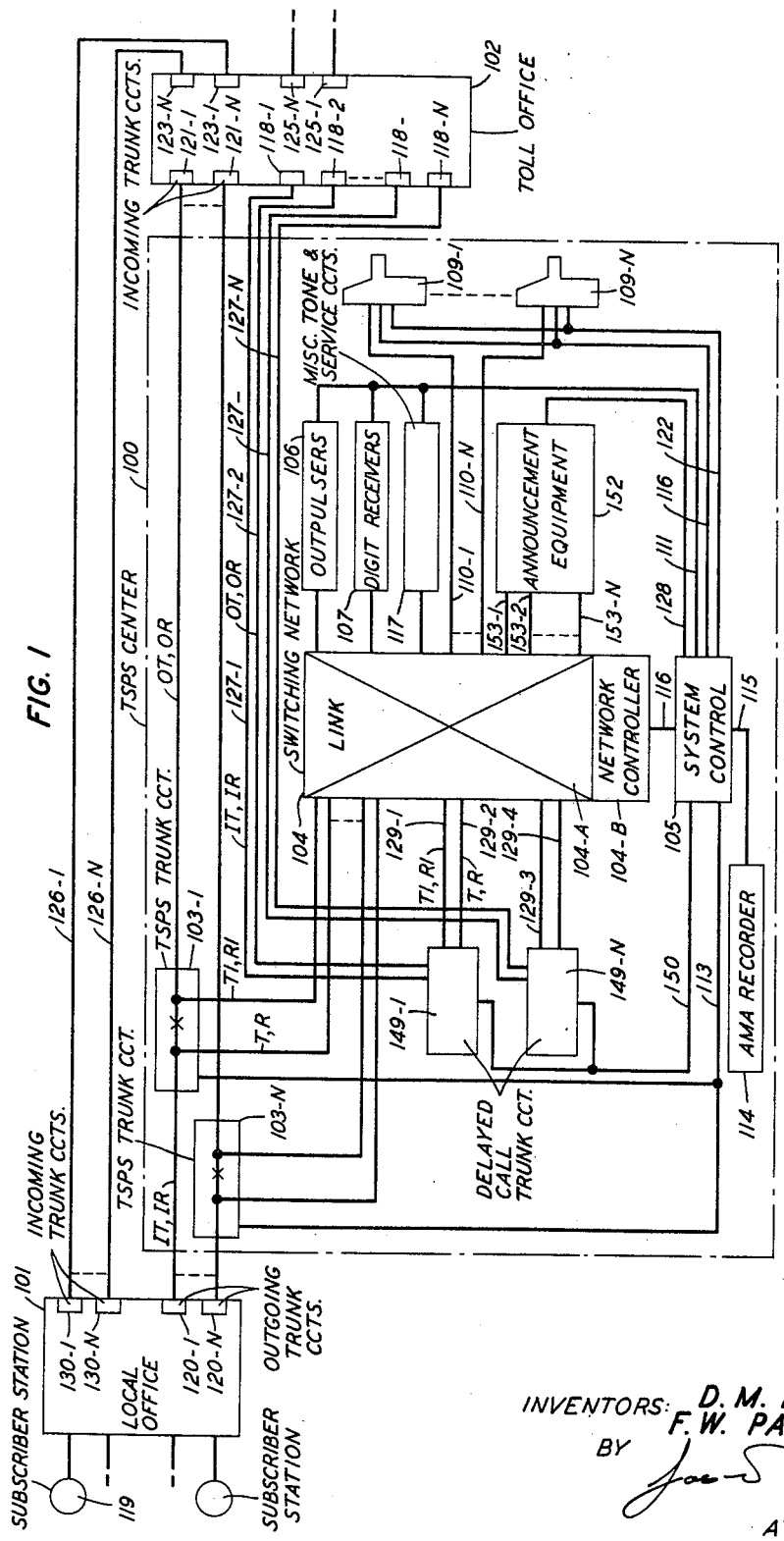
FIG. 1
INVENTORS: D. M. DUFT
F. W. PADDEN
BY
ATTORNEY

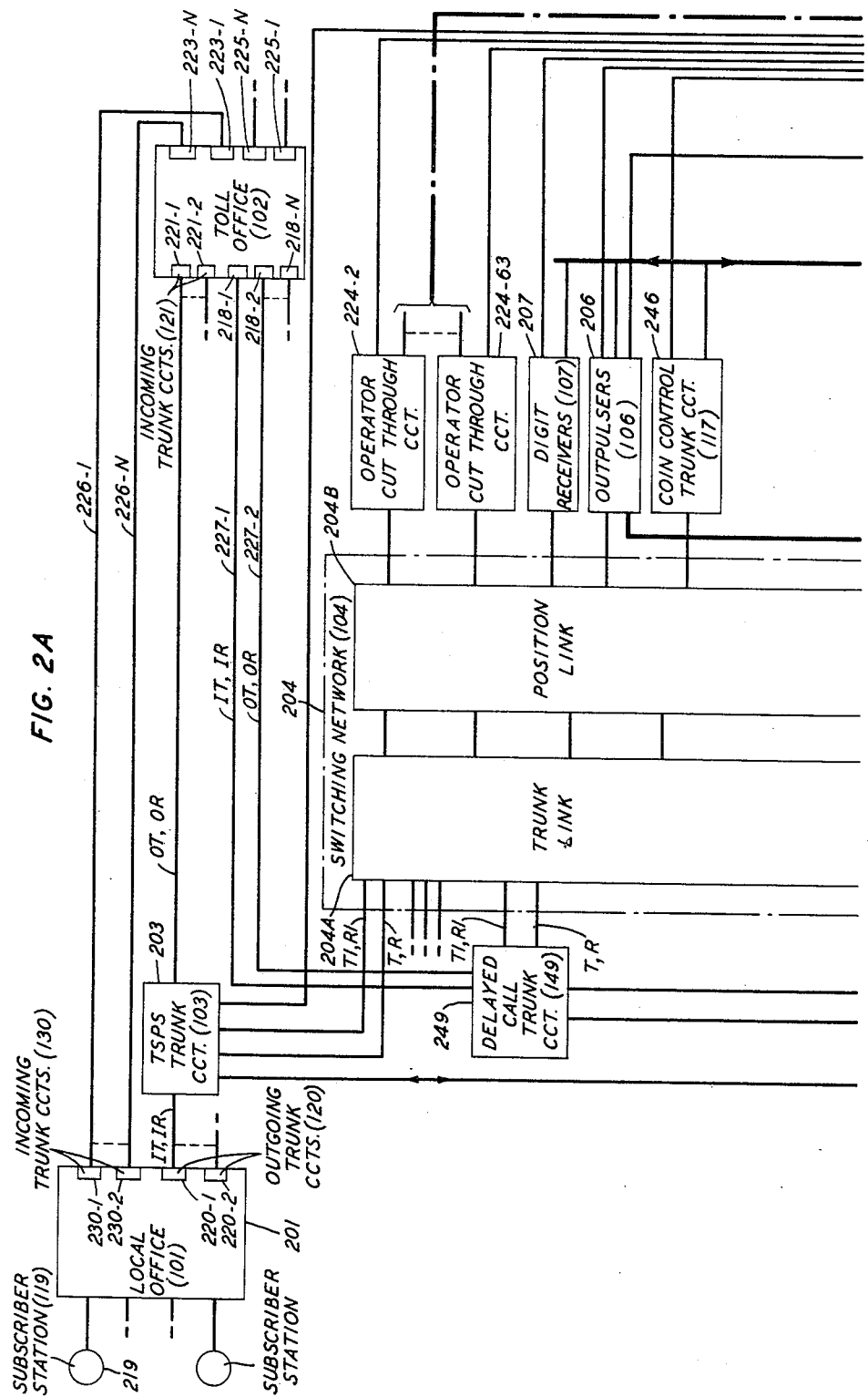

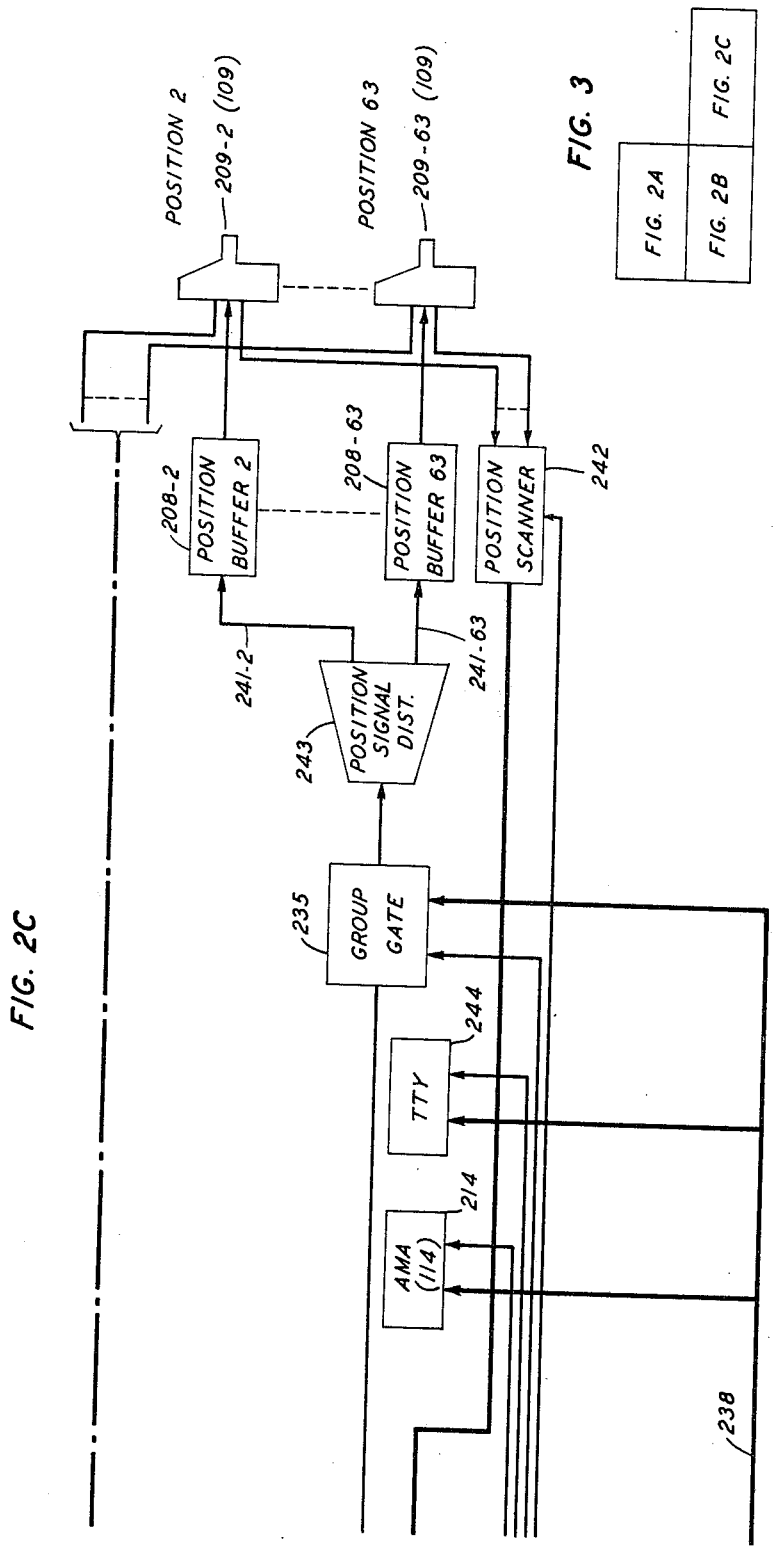

FIG. 4

FIG. 5
MF. TRUNK CCT.

| | 0 | 1 | 3 | 2 |
|---|---|---|---|---|
| | IDLE | NOT USED | NOT USED | NOT USED |
| | 4 | 5 | 7 | 6 |
| | STOP SIGNAL; OPR. ATTACHED; OUTPULSER ATTACHED; RLS. FWD.; OUTPULSE CLD. NO.; MB | CUT-THRU ANNOUNCEMENT | COIN CONTROL OR RINGBACK | HOLD |

A OPERATED — covers columns 0,1,3
B OPERATED — covers columns 3,2
C OPERATED — covers rows 4,5,7,6

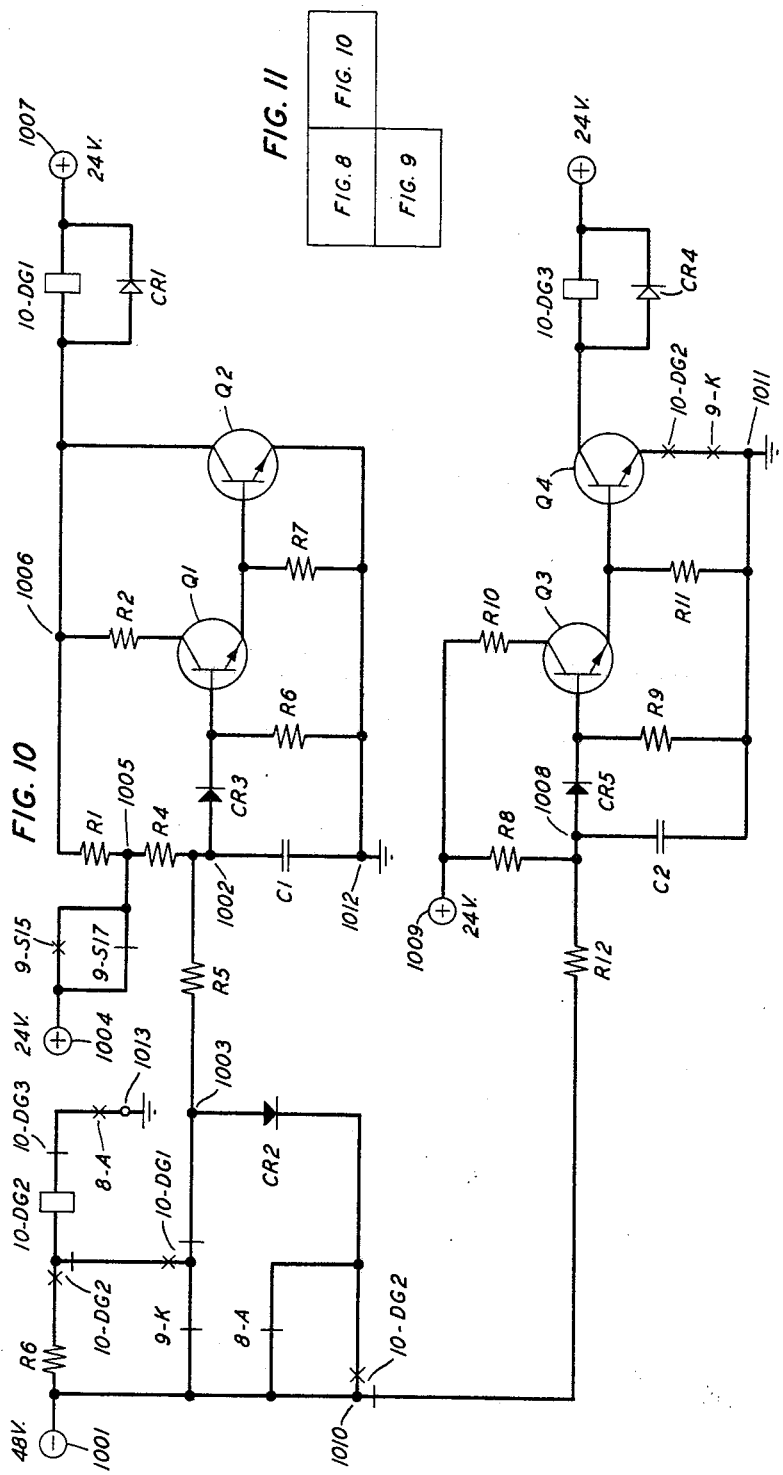

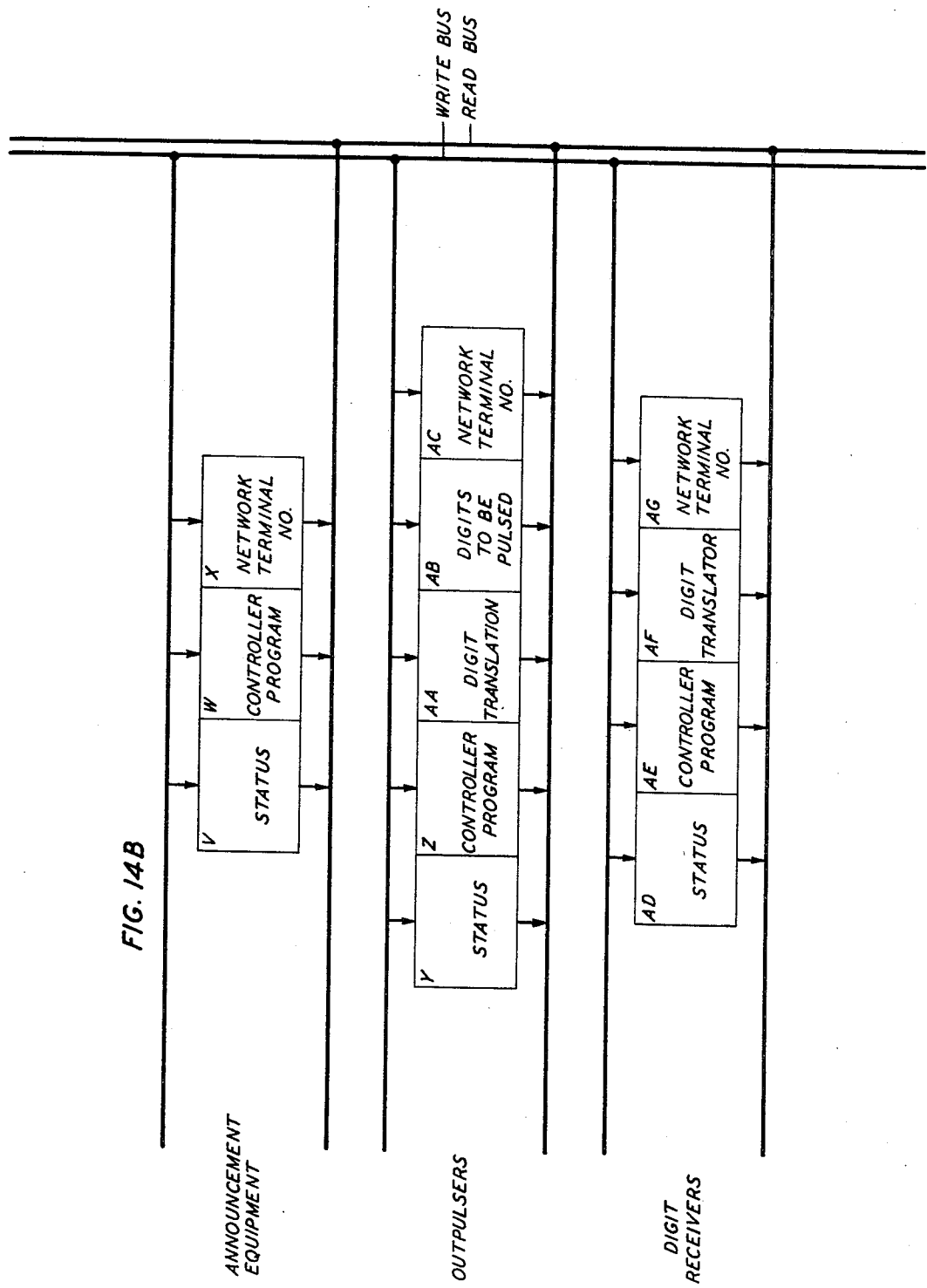

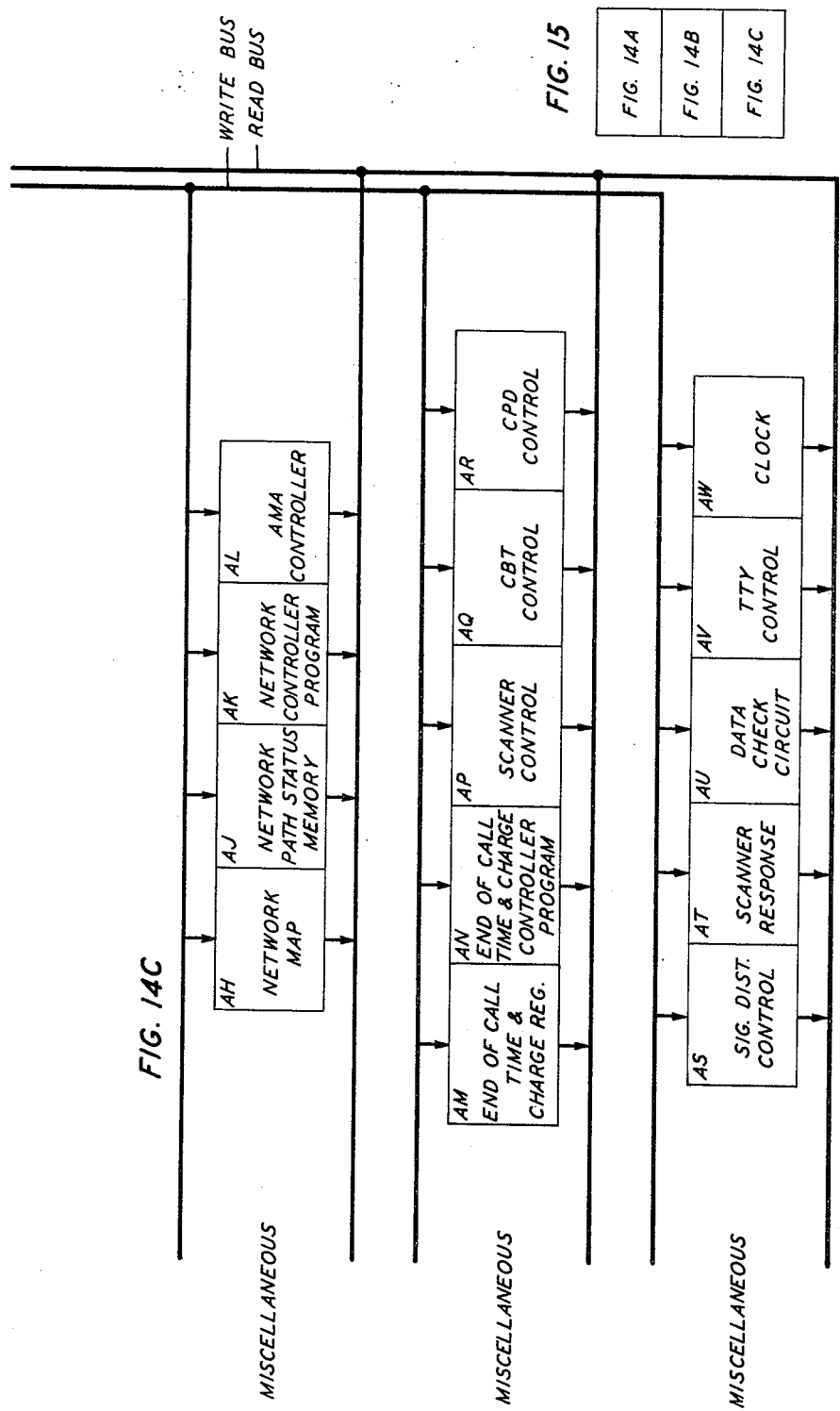

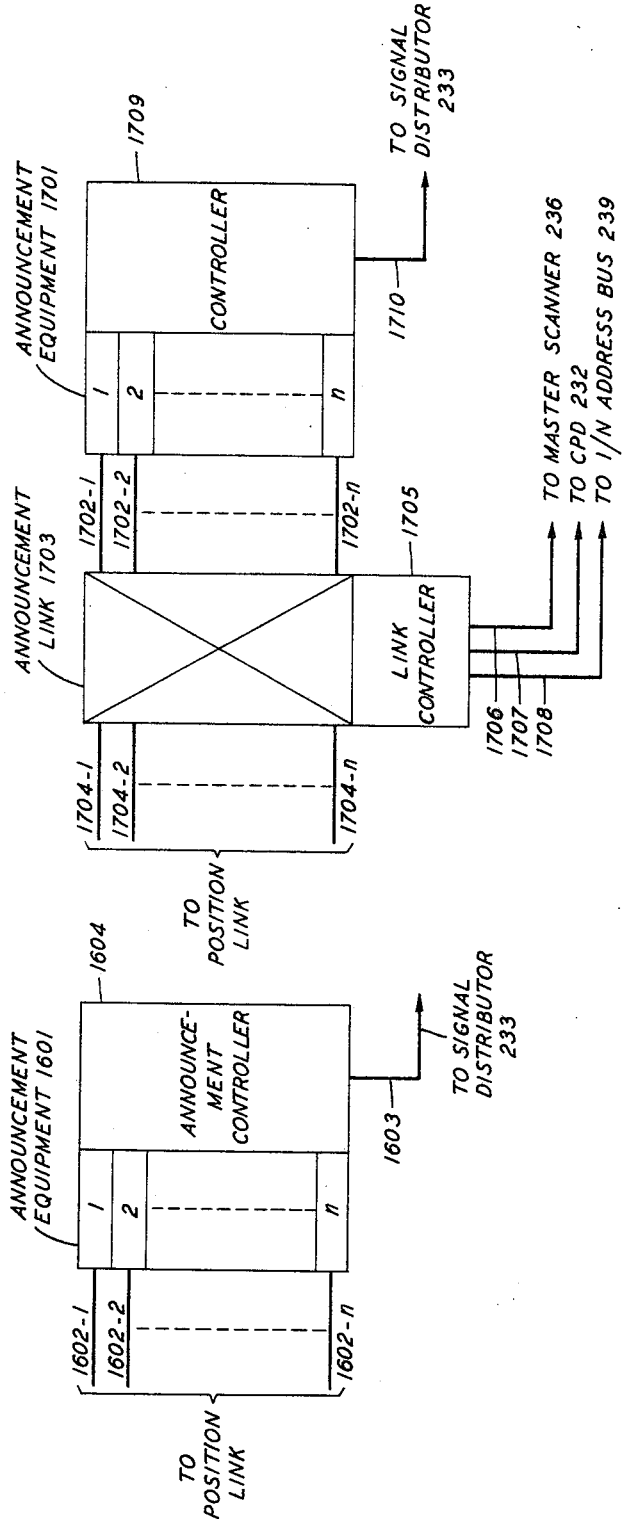

United States Patent Office 3,492,433
Patented Jan. 27, 1970

3,492,433
EQUIPMENT FOR AUTOMATICALLY RETRYING CUSTOMER-DIALED CALLS
Donald M. Duft, Summit, and Frederick W. Padden, Bridgewater Township, Somerset County, N.J., assignors to Bell Telephone Laboratories, Incorporated, Murray Hill and Berkeley Heights, N.J., a corporation of New York
Filed July 20, 1966, Ser. No. 566,643
Int. Cl. H04m 3/00
U.S. Cl. 179—18                                                23 Claim

ABSTRACT OF THE DISCLOSURE

A switching system is disclosed which automatically retries, at a subsequent time, calls that cannot be successfully completed when first attempted, such as for example, those which encounter a called station busy condition. After the system determines that the call currently cannot be completed, it transmits an announcement to this effect to the calling party advising him that if he desires to have the call automatically retried, he should flash his switch hook and dial digits specifying the time the call is to be retried. The system controller stores the newly dialed digits, together with the call information it has priorly received, and automatically retries the call upon the arrival of the specified time.

---

Figure 2B:
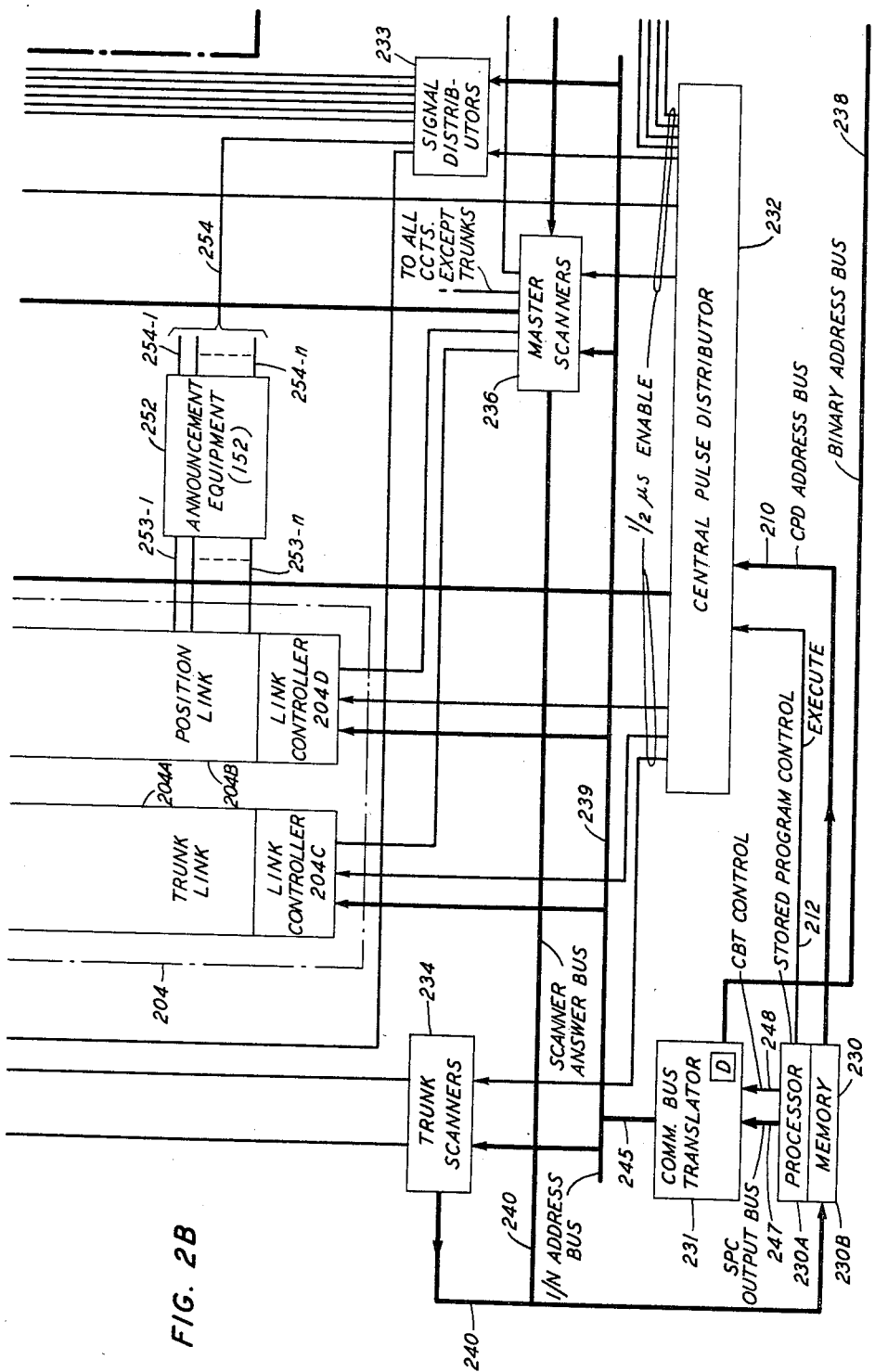

This invention relates to a switching system, and in particular to a switching system having equipment for automatically retrying customer-dialed calls that cannot be successfully completed when first attempted. This invention further relates to a switching system which, upon a determination that a call cannot be currently completed, notifies the calling party to this effect, registers information transmitted from the calling station specifying the time at which the call is to be subsequently attempted, and automatically retries the call upon the arrival of the specified time.

Many calls are not successfully completed when first attempted. The two most common reasons for this are that the called station is either busy or does not answer. Although many of these calls are ultimately completed on subsequent attempts, many are not and are permanently abandoned. The abandonment of a call before its completion is undesirable for a number of reasons. It is undesirable to telephone subscribers since it prevents them from obtaining the call service they request. It is undesirable to the telephone company since, in many cases, no revenue is received from the use of its facilities until a call is completed. This latter factor was not of compelling significance to telephone companies in the past when customer dialing ranges were relatively limited and were primarily confined to local type calls. However, with the advent of direct distance dialing, the abandonment of an attempted toll call becomes of far greater significance since the establishment of a connection extending up to many thousands of miles may be required to determine that the called station is busy or does not answer.

It is therefore an object of the invention to reduce the number of calls that are abandoned after failing to be completed when first attempted.

It is another object of the invention to provide facilities for automatically retrying calls which are not successfully completed when first attempted.

In accordance with a specific illustrative embodiment of our invention, equipment is provided which permits calls that are not completed on their first attempt to be retried automatically. Advantageously, this automatic retry is effected without operator assistance at a subsequent time specified by the calling party. During the serving of a call by a system embodying our invention, a determination is made that the call cannot be successfully completed whenever the called station is busy or does not answer. This determination is made by equipment which detects the presence of a busy tone on the forward connection if the called station is busy, or by equipment which detects the application of ringing current to the called line for a predetermined time during which the called party does not answer. Once the determination is made that the call currently cannot be completed, the forward connection is released and announcement apparatus provided in accordance with our invention is connected to the calling connection to transmit a message to the calling party advising him that his call cannot currently be completed and that, if he desires to have it automatically retried, he should flash his switch hook contacts and dial digits specifying the time the call is to be retried.

In the event the calling party desires to avail himself of this service, the flashing of his switch hook is detected and the digits he dials specifying the time the call is to be retried are received, registered, and stored for future use. The connection back to the calling station is released when the calling party hangs up. The system controller has within it at this time all the information it received when the call was initially attempted, as well as the newly dialed digits specifying the time the call is to be retried. A system clock times the delay interval following which the call is to be reattempted and, upon the expiration of this interval, the system effects the establishment of a connection to the calling station, transmits an announcement to the calling party advising him that his call will now be retried, and finally outpulses information forward to control the establishment of a connection to the called station. The call is served in the conventional manner in the event that the called station is not busy and the called party answers. If the called station is busy, or does not answer, the foregoing described procedure is repeated and the calling party once again is offered the opportunity of having his call automatically retried. This procedure may be repeated as many times as desired until the call is either successfully completed or abandoned by the calling party.

It may be seen from the foregoing that our invention offers improved service by reducing the number of calls that are permanently abandoned after failing to be completed on their first attempt.

Features of our invention include the provision of equipment:

(1) For automatically retrying customer-dialed calls which cannot be successfully completed when first attempted;

(2) For determining that a call cannot be currently completed in response to the return of busy tone or the return of ringing tone for a predetermined time during which the called station does not answer;

(3) For furnishing an announcement to the calling party advising him that facilities are available for automatically retrying the call at a subsequent time specified by him after a determination has been made that the initial call attempt cannot currently be completed;

(4) For monitoring the call following the transmission of the announcement to ascertain whether the calling party requests automatic call retry service;

(5) For receiving information from the calling station specifying the time at which the call is to be retried if the retry service is requested, for storing this information, and for automatically retrying the call upon the arrival of the specified time;

(6) For retrying a call at a subsequent time automatically specified by the system in response to a call failure;

(7) For automatically retrying a call at a subsequent time specified by the system or at a subsequent time specified by the calling party;

(8) For computing the initial period charge for a connection between a calling and a called station and for denying the availability of call retry service to the calling station in the event the charge does not exceed a predetermined minimum;

(9) For receiving from a calling station information including data specifying the subsequent time at which a call is to be completed and, upon the arrival of the specified time, for completing the call.

Figure 6:
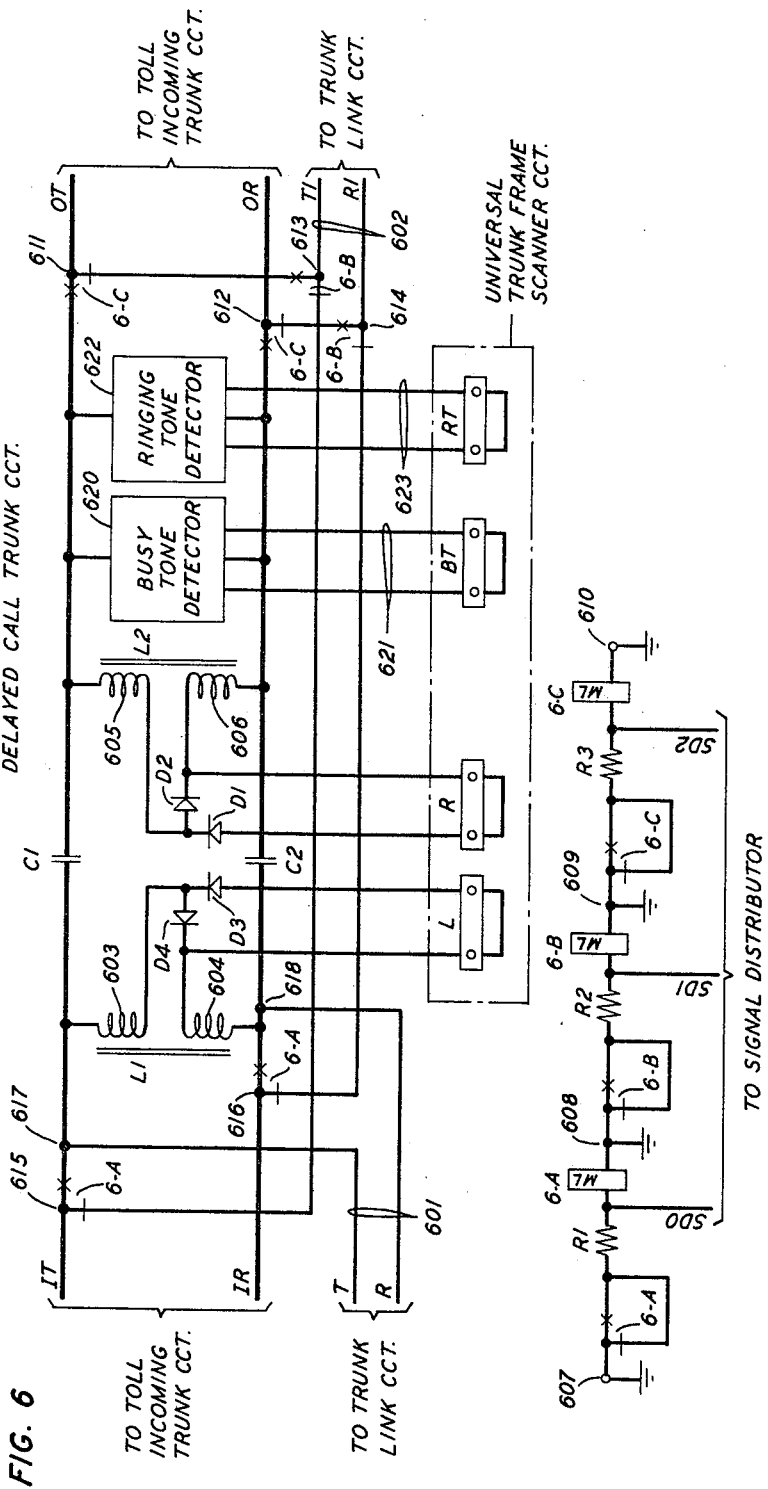
Figure 7:
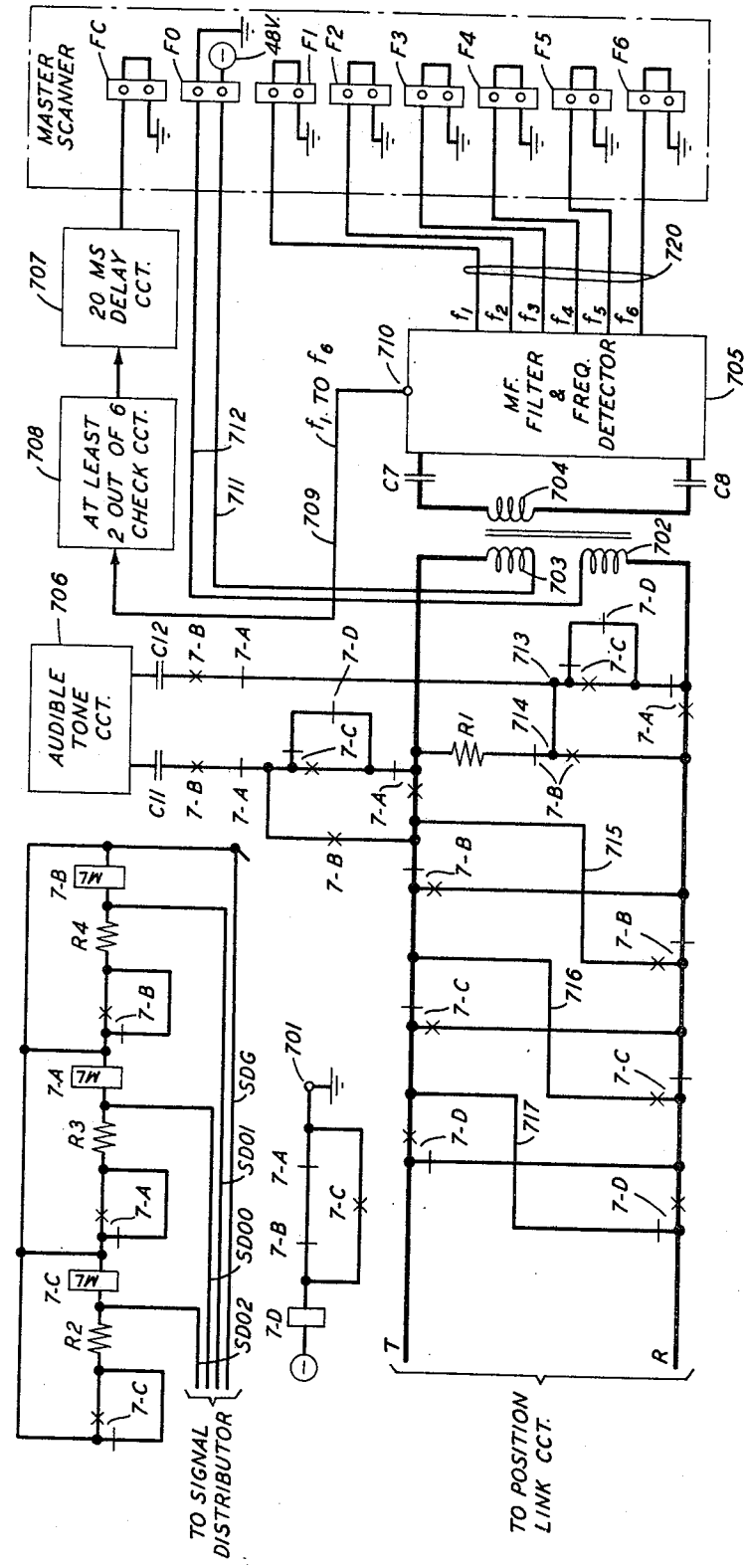
Figure 8:
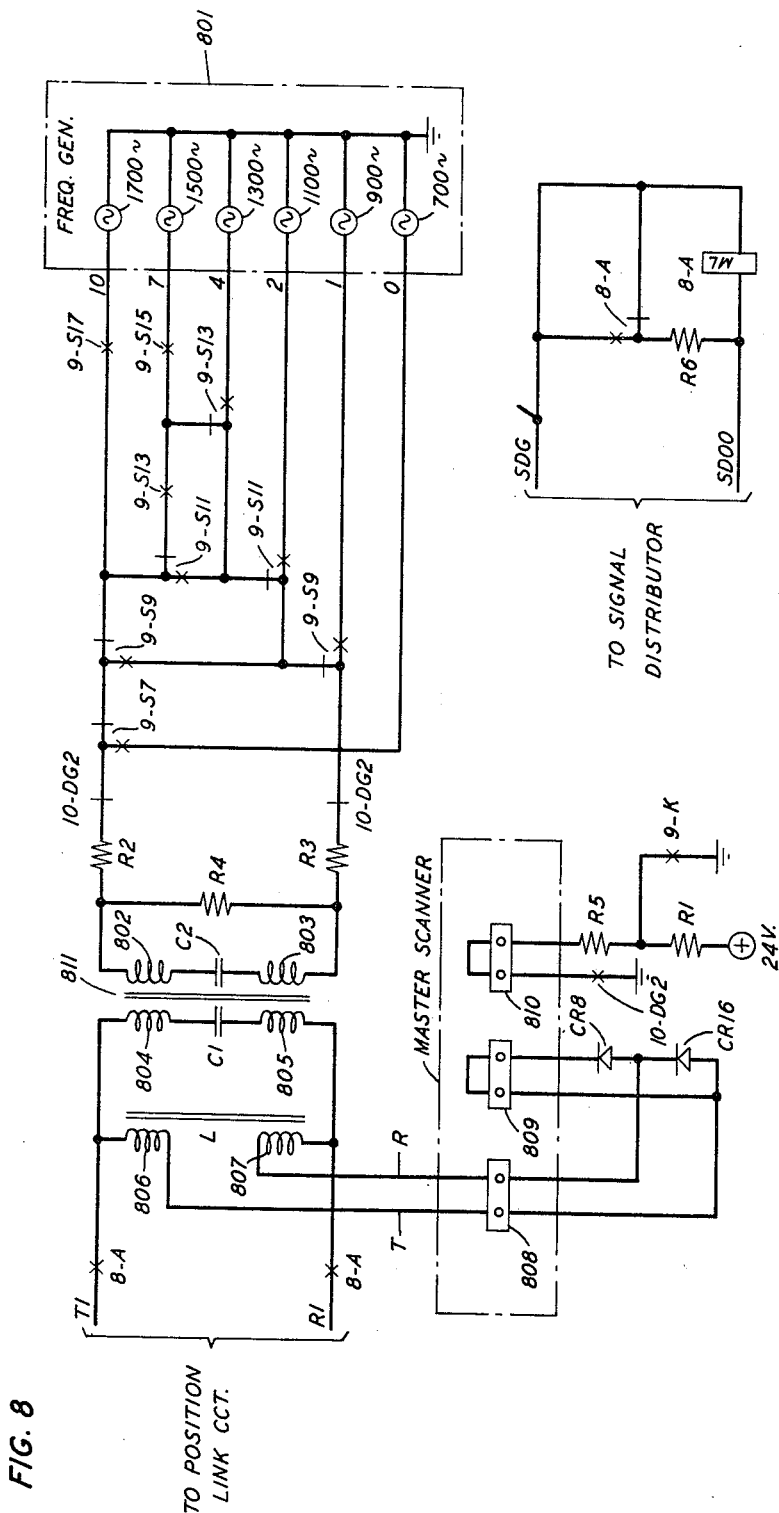
Figure 9:
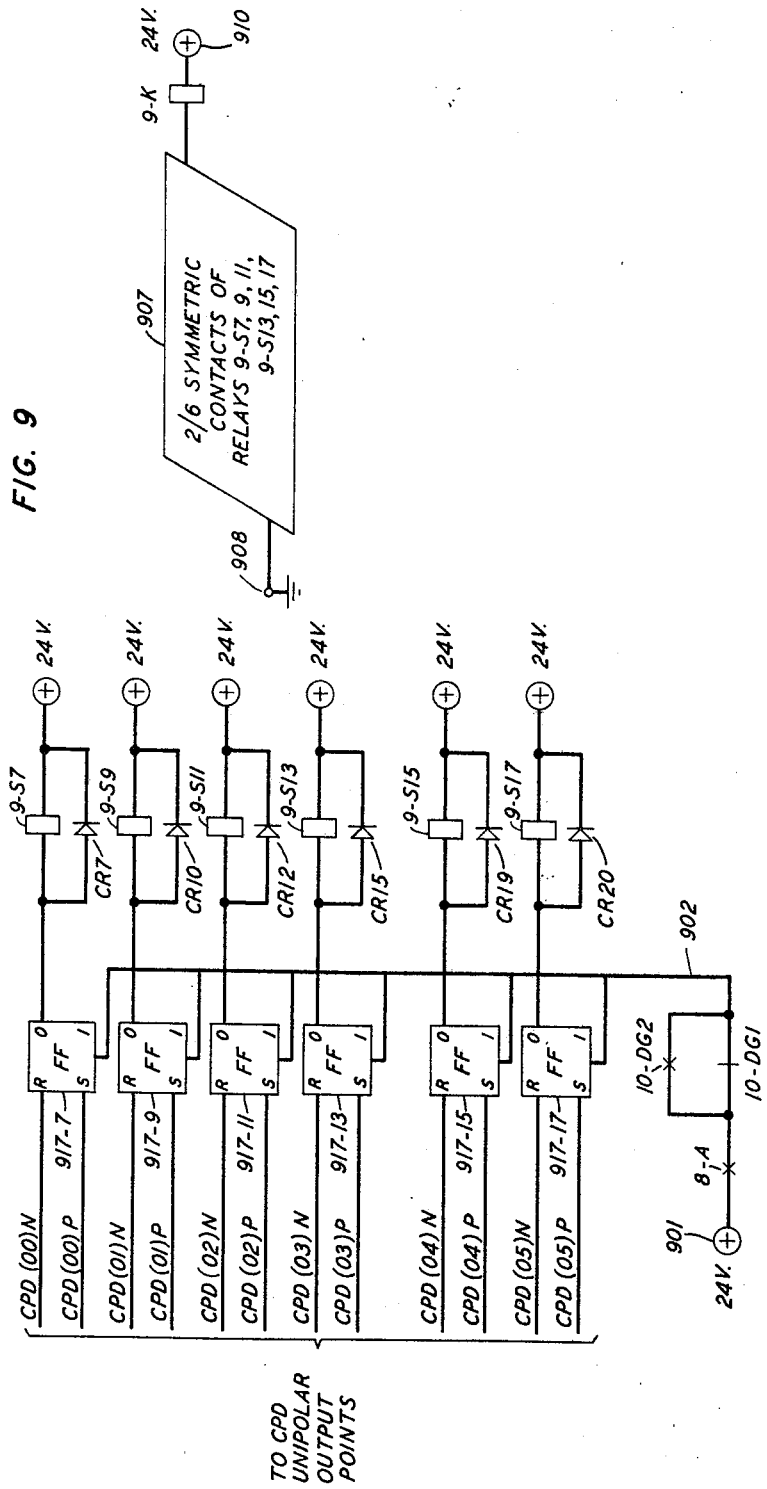

These and other objects and features of the invention will become more apparent upon a reading of the following description thereof taken in conjunction with the drawings, in which FIG. 1 discloses our invention in block diagram form;

FIGS. 2A through 2C, when arranged as shown in FIG. 3, diagrammatically disclose additional details of our invention;

FIGS. 4 and 5 disclose a trunk circuit arranged for MF signaling;

FIG. 6 discloses a delayed call trunk circuit;

FIG. 7 discloses an MF receiver;

FIGS. 8, 9, and 10, when arranged as shown in FIG. 11, disclose an MF outpulser;

FIGS. 12, 13, and 14A through 14C, when arranged as shown in FIG. 15, disclose a stored program system controller; and FIGS. 16 and 17 disclose the announcement apparatus.

BLOCK DIAGRAM—FIG. 1

FIG. 1 diagrammatically discloses our invention in a manner which facilitates an understanding of its boader aspects. The invention is shown thereon as embodied in a system of the type disclosed in the R. J. Jaeger, Jr.-A. E. Joel, Jr. application, Ser. No. 519,787, filed Jan. 10, 1966. The Jaeger-Joel specification is hereby incorporated as a part of the present specification to the same extent as if fully disclosed herein. Jaeger and Joel disclose call-serving equipment situated intermediate one or more local offices and a toll office for providing various types of call service on calls incoming to the toll office from the local offices it serves on an originating basis. The Jaeger-Joel system is not a switching system and is typically referred to as a traffic service position system (TSPS), since it is independent, both geographically and equipmentwise, of any existing office and since its sole function is to provide call service that cannot be economically or efficiently provided at existing offices. Each call extended via the TSPS center to the toll office is monitored and timed and, if required, pertinent charge data therefor recorded upon its termination. Operator assistance is provided when required on a call in connection with its forward establishment by means of a temporary connection to an available TSPS operator position.

Shown on FIG. 1 is a TSPS center 100 interconnected between a local office 101 and a toll office 102. The TSPS center contains a plurality of trunk circuits 103–1 through 103–N, each of which is connected on its incoming side to a corresponding one of local office outgoing trunk circuits 120–1 through 120–N and on its outgoing side to a corresponding one of toll office incoming trunk circuits 121–1 through 121–N. Each local office outgoing trunk circuit is individual to a different TSPS trunk circuit 103– and, in turn, to a different toll office incoming trunk circuit 121–. Each call from a local office is extended via a selected outgoing trunk circuit 120– to its associated TSPS trunk circuit, and, in turn, to its associated incoming toll trunk circuit.

The local office 120 also has a plurality of incoming trunk circuits, 130–1 through 130–N, which are connected via conductor pairs 126–1 through 126–N to outgoing trunk circuits 123–1 and 123–N of the toll office. The toll office also includes a plurality of outgoing trunk circuits 125–1 through 125–N extending forward to other offices not shown.

The TSPS center further includes a switching network 104, which is connected on its left side to trunk circuits 103– and on its right side to various other circuits, such as for example, outpulsers 106, digit receivers 107, operator positions 109–, announcement equipment 152, and miscellaneous other circuits which, for the purpose of this figure, are represented generally as miscellaneous tone and service circuits 117. Switching network 104 includes link 104A, which contains the circuit paths required to interconnect the circuits having left side network appearances with those having appearances on its right side. The network 104 further includes network controller 104B which controls the operation of the link in its path-establishing functions.

Each TSPS trunk circuit 103– is connected by means of two separate conductor pairs to two separate link appearances on the left side of link 104A. Conductor pair T and R connects the incoming side of the trunk circuit to the link. This permits the circuits on the right side of the link to communicate with the local office. The T1 and R1 conductor pair connects the outgoing end of the trunk circuit to the link. This permits the circuits on the right side of the link, such as for example, outpulsers, to communicate with the toll office.

The TSPS center also includes a plurality of delayed call trunk circuits 149–1 through 149–N, each of which is connected to two separate incoming trunk circuits at the toll office, as well as two separate appearances on the left side of network 104. For example, delayed call trunk circuit 149–1 is connected by means of the two conductor pairs 127–1 and 127–2 to toll office incoming trunk circuits 118–1 and 118–2, respectively. This delayed call trunk circuit is also connected by means of the two conductor pairs 136 and 137 to two appearances on the left side of the switching network.

TSPS 100 further includes a system controller (system control 105), which is connected by cable 113 to trunk circuits 103–, by cable 116 to controller 104B, by cable 115 to the AMA recorder 114, by cable 111 to outpulsers 106, digit receivers 107, and service circuits 117, by cable 150 to delayed call trunk circuits 149–, by cable 122 to operator positions 109–, and by cable 128 to the announcement equipment 126. These connections permit the system control to regulate, control, and coordinate the operation of each circuit in order that the TSPS center may furnish the service required of it on each call.

Digit receivers 107 receive call information outpulsed from a local office on each call served by the TSPS center. These receivers may be of different types, such as for example, DP or MF, depending upon the mode of outpulsing utilized. Outpulsers 106, which advantageously may be of the MF type, transmit to the toll office the information it needs on each call. AMA recorder 114 records pertinent charge data upon the termination of a call in response to information received from system control 105.

In order to illustrate the operation of our invention as shown on FIG. 1, let it be assumed that a customer-dialed call of the station-to-station type originates at station 119. Let it further be assumed that this call is routed to toll office 102 via the TSPS center. Finally, let it be assumed that in serving this call, local office 101 selects outgoing trunk circuit 120–1. The seizure of this outgoing trunk circuit generates a signal which is received by TSPS trunk circuit 103–1 and transmitted to system control 105 over cable 113. System control responds and commands controller 104B to establish a network connection between the T and R conductors of trunk circuit 103–1 and digit receiver 107. The digit receiver detects the calling and called office information outpulsed from the local office and transmits it to system control over cable 111. The network connection to the receiver is released when the local office outpulsing has been completed.

The system control next attempts the forward establishment of the call by causing the link controller to establish a network connection between outpulser 106 and the T1 and R1 conductors of trunk circuit 103–1. Once this connection is established, the outpulser transmits call information forward to the toll office, which, in turn, controls the establishment of the forward connection to the terminating office and called station. The call is served in the manner described in detail in the Jaeger-Joel specification, in the event the called station answers and is not busy. The function of the TSPS equipment for the remainder of the call in this case is to monitor and time the call and record the necessary charge data therefor upon its termination.

Let it be assumed, in order to illustrate the operation of our invention, that the called station is either busy or that the called party does not answer. If the called station is busy, the TSPS equipment, including the system controller, determines that the call cannot be completed by detecting the busy tone returned from the called office. If the called party does not answer, the TSPS equipment makes this determination by detecting the application of ringing tone to the called line for a predetermined period during which the called party does not answer. Once the determination is made that the call cannot currently be completed, system control operates relays within the trunk circuit 103–1 to release the forward connection. At the same time, it controls the network controller so that it establishes a link connection between the T and R conductors of trunk circuit 103–1 and a right side link appearance of announcement equipment 152 via one of conductors 153–. This equipment may comprise either a plurality of recorded tracks, each of which contain the entirety of a separate message, or alternatively, it may comprise recorded announcement tracks containing less than a complete message, together with equipment for synthesizing any message by connecting a call to a plurality of tracks sequentially in a required timed relationship.

When the connection between the T and R conductors of trunk circuit 103–1 and the announcement equipment is completed, system control transmits signals over cable 128 so that an announcement is transmitted to the calling party advising him that the call cannot currently be completed and that if he desires to have it automatically retried at a subsequent time, he should flash his switch hook and dial digits specifying this time, such as for example, the digits 10, in the event he wants the call retried in ten minutes. The announcement equipment is disconnected by the network fom the trunk circuit following the conclusion of the announcement.

Let it be assumed that the calling party desires to avail himself of this service, and that he therefore flashes his switch hook and dials the digits 10. The switch hook flash is detected by system control, which, in response thereto, causes the network to connect a digit receiver 107 to the T and R conductors of trunk circuit 103–1. The digits dialed by the calling party, signifying the time at which the call is to be subsequently retried, are detected by digit receiver 107 and transmitted to system control over cable 111. The digit receiver is then disconnected from the trunk circuit. System control stores the newly dialed digits, together with the call information it has priorly received, and releases the connection back to the local office when the calling party hangs up.

Subsequently, upon the arrival of the specified time, system control selects an idle delayed call trunk circuit, such as for example, 149–1, and establishes a network connection between conductor pair 129–1 of this trunk circuit and an idle outpulser 106. At the same time, system control causes the delayed call trunk circuit to transmit a seizure signal over conductor pair 127–1 to the incoming trunk circuit 118–1 of the toll office. Next, the outpulser transmits over this path the directory number of the calling station to the toll office which, in response thereto, controls the establishment of a connection to the calling station 119. The outpulser 106 is released upon the conclusion of its outpulsing operation for the calling information. The toll office establishes this connection over one of its outgoing trunk circuits 123– extending over one of conductor pairs 126– to one of the incoming trunks 130– of the local office. For example, let it be assumed that, in establishing this connection, the toll office seizes its outgoing trunk circuit 123–1, which is connected over conductor pair 126–1 to incoming trunk circuit 130–1 of the local office. Once this connection is established, the toll office outpulses to the local office the information it requires to establish a connection between its incoming trunk circuit 130–1 and the calling party at station 119. The announcement equipment is connected to the conductor pair 136 of the delayed call trunk circuit 138–1, and, when the calling party answers, a message is transmitted to him stating that his call is about to be retried in accordance with his request. The announcement equipment is released upon the conclusion of this message. Next, the outpulser is connected to the conductor pair 129–2 of the delayed call trunk circuit and a seizure signal is sent over conductor pair 127–2 to incoming trunk circuit 118–2 at the toll office. The outpulser transmits to the toll office over this connection the information required for it to establish a forward connection to the terminating office and called station. The outpulser is released upon the termination of its outpulsing function.

If this call attempt is successful, i.e., the called station answers, the remainder of the call is served in the normal manner described in the Jaeger-Joel specification with the TSPS equipment monitoring and timing the call and recording the required charge data therefor upon the call termination. If the call attempt is not successful, such as for example, if a busy tone is again encountered or if the call is not answered after a predetermined number of ringing tone applications, the announcement equipment is connected to conductor pair 129–2 and the calling party is once again offered the opportunity of having his call automatically reattempted at a time specified by him. The foregoing sequence of operations may be repeated as many times as required to either obtain a connection to the called station or until the calling party abandons the call.

DETAILED DESCRIPTION—FIGS. 2A
THROUGH FIGS. 2D

FIGS. 2A through 2C, when arranged as shown in FIG. 3, disclose additional details of our invention. Each element on FIGS. 2 corresponding to an element on FIG. 1 is designated in a manner to indicate the correspondence. Thus local office 201 on FIG. 2 corresponds to local office 101 on FIG. 1, etc. Whenever such a one-for-one correspondence is possible, each such element on FIGS. 2 has, inside the rectangle representing the element, parentheses enclosing the numerical designation of the corresponding element on FIG. 1. However, a one-for-one correspondence between each element on FIGS. 2 and FIG. 1 is not always possible, since FIGS. 2 is considerably more detailed and contains many elements which are not separately shown on FIG. 1.

The embodiment of FIGS. 2 is similar to that of FIG. 1, in that it discloses a local office 201 having an outgoing trunk circuit 220 extending via TSPS trunk circuit 203 to an incoming trunk circuit 221 and a toll office 202. Only one such interconnection between a local and a toll office is shown in order to minimize the complexity of the drawing and to facilitate an understanding of the invention. Also, only a single delayed call trunk circuit 249 is shown for the same reason. Network 204 comprises a two-stage network having a trunk link 204A and a position link 204B, together with link controllers 204C and 204D. The two links together function to interconnect TSPS trunk circuits having trunk link appearances with the service circuits having appearances on the right side of the position link. These circuits are shown in greater detail on FIGS. 2A and 2B and comprise outpulsers 206, digit receivers 207, coin control trunk circuits 246, operator cut-through circuits 224, and the announcement equipment 252. The digit receivers, the outpulsers, and the announcement apparatus perform the same functions already described in connection with FIG. 1. The coin control trunk circuit 246 performs a coin control and ringback operation in the manner described in detail in Jaeger et al. The operator cut-through circuits are rudimentary trunk circuits whose function is to interconnect the talking circuits of each operator position with an appearance on the position link. The operator positions are shown on the right side of FIG. 2C and are designated 209-2 through 209-63. Each position is individually associated with one of the position buffers 208-2 through 208-63. Each operator position is also individually connected to one of the operator cut-through circuits 224-2 through 224-63, each of which on its left side extends to an individual position link appearance. The details of the equipment provided in each operator position, together with the manner in which each functions during the serving of the various types of calls that may be extended to a position is described in detail in the Jaeger-Joel specification, to which reference is made for an understanding of these details.

System control 105 on FIG. 1 is not shown as such on FIG. 2 since it represents many circuits which are individually shown on FIG. 2 and which together cooperate to control the operation of the system. These circuits on FIG. 2 include stored program control 230, hereinafter referred to as "SPC," communications bus translator (CBT) 231, central pulse distributor (CPD) 232, signal distributor 233, trunk scanners 234, master scanners 236, group gate 235, and position signal distributor 243. The embodiment of the invention shown on FIGS. 2, as well as on other drawing figures, comprises an electronic stored program controlled system which utilizes many circuits similar to those shown in detail in the copending application to A. H. Doblmaier, et al., Ser. No. 334,875, filed Dec. 31, 1963. Doblmaier et al. discloses an electronic type local office which is controlled in its operation by a real time stored program processor. The Doblmaier et al. system is also disclosed in detail in the entirety of the September 1964 issue of the Bell System Technical Journal.

The SPC may be considered to be the "brain," or basic controlling mechanism for the entire TSPS center. It comprises a stored program real time machine having a processor 230A and a memory 230B. The processor performs arithmetic and logical operations on the data it receives from circuits external to the SPC, such as for example, from the scanners. The memory comprises bulk memory, which is supplied in sufficient quantity to store all the temporary and semipermanent information and data required for the operation of the TSPS center. As described in Doblmaier et al., as well as in Jaeger and Joel, the SPC, in performing its functions, receive signals from memory and from the scanners, performs the necessary arithmetic and logical operations in response to the received signals and generates output commands which are transmitted to other circuits to control them in the performance of their required call functions. The circuits which respond to the SPC output commands are referred to as "peripheral circuits" since they are peripheral, or external, to the SPC.

The SPC communicates with the peripheral circuits by means of communication paths referred to in this specification as "buses." On FIG. 2, the buses which transmit SPC commands to the various peripheral circuits are the 1-out-of-N address bus 239 and the binary address bus 238. The SPC transmits its output commands in binary form to the CBT over conductor paths 247 and 248. The CBT applies the SPC binary information to the binary address bus system. The CBT also translates the SPC binary output into a plurality of 1-out-of-N information bits and applies these to the 1-out-of-N address bus system. Thus, for each binary command received, the CBT applies a corresponding binary command to the binary address bus and, in turn, to the peripheral circuits served by this bus. Simultaneously, a 1-out-of-N type command is applied to the 1-out-of-N address bus and to the peripheral circuits it serves.

Each command transmitted from the SPC via the CBT to the address bus system functionally represents or indicates a task that is to be performed by a peripheral circuits. Each address bus system comprises a plurality of wires, most of which are connected to a plurality of peripheral circuits in common. Thus, a command applied by the CBT to a combination of address bus conductors is transmitted to all peripheral circuits to which this combination of conductors is connected. In the normal course of events, only one peripheral circuit responds to a command, even though many peripheral circuits receive it.

The input portion of each peripheral circuit is arranged so that it does not respond to an address bus command unless it has first been primed or unlocked by the reception of a special signal hereinafter termed an "enable pulse." The central pulse distributor operating under control of the SPC is the circuit which transmits enable pulses to the peripheral circuits. These pulses are transmitted over dedicated conductor pairs unique to each peripheral circuit. The SPC effects the operation of a selected peripheral circuit by causing the CBT to gate onto the address bus system the command specifying the desired operation of the selected peripheral circuit and, at the same time, by causing the CPD to transmit an enable pulse over a dedicated conductor pair to the selected peripheral circuit. The peripheral circuits that operate in this manner include the switching network 204, signal distributors 233, trunk scanners 234, master scanners 236, group gate 235, the AMA recording facilities 237, and the teletypewriter facilities 238. The CPD and the CBT also operate in this manner. However, both their input commands and enable pulses are transmitted to them directly from the SPC.

The function of the trunk scanner is to monitor the current state of each trunk circuit and, upon command, report its findings to the SPC. The trunk scanner is connected to a plurality of circuit points within each trunk circuit, and each such circuit point is, in turn, individually connected to a different sensing device, termed a "ferrod," in the scanner. Each ferrod has a plurality of windings, one of which is connected across its associated trunk circuit point so that the magnetic state of the ferrod is controlled by the current applied to its winding by the trunk circuit point to which it is connected. The other windings of each ferrod are wired so that the scanner may be selectively controlled by the SPC to provide an indication of the existing circuit state. The master scanners are similar to the trunk circuit scanners except that they monitor the operational states of circuits other than trunk circuits. These include the service circuits, the digit receivers, and the coin tone receivers connected to the right side of the position link.

Ferrods are further described, inter alia, in the Baldwin-May Patent 3,175,042 of Mar. 23, 1965 and in an article entitled, "No. 1 ESS Scanner, Signal Distributor, and Central Pulse Distributor," by Freimanis, Guercio, and May in the Bell System Technical Journal, vol. 43, page 2255 (September 1964, Part II). Ferrods are further described in the Jaeger-Joel specification.

The scanner ferrods are arranged into rows of 16 ferrods each. Each command received by a scanner specifies a ferrod row that is to be interrogated. The information resulting from the interrogation is transmitted to the SPC over bus system 240, designated "scanner answer bus." With this arrangement, the transmission of a command to a scanner instructing it to interrogate a particular row of ferrods, causes information to be transmitted back to the SPC signifying the current state of all circuit points within the system to which the plurality of ferrods in the interrogated row are connected.

The signal distributor 233 basically comprises a matrix or relay tree type translator, whose function is to receive the microsecond type signals from the CPD and the 1/N address bus and, in turn, transform them into signals having the persistence required to operate and release magnetic latching relays in the circuits of our system which utilize relays. These relays are primarily contained in the trunk circuits and in the service circuits. Signal distributors are further described in the aforementioned issue of the Bell System Technical Journal, as well as in the Jaeger-Joel specification.

The trunk link and position link circuits of the switching network 204 operate in response to the reception of the coincidently received signals from the CPD and the 1/N address bus system. These commands cause them to establish link connections between their left side and right side appearances. The paths by which these connections are to be established are not determined by the links but, instead, by the SPC in response to the information it receives from its stored program memory. Switching networks of the type suitable for use with the present invention are disclosed in detail in the aforementioned issue of the Bell System Technical Journal, as well as in the patents cited in the Jaeger-Joel specification.

The AMA circuit 214 is connected to the binary address bus and it includes tape recorders together with buffer registers and recorder control circuits. Its function is to record call charge data in response to SPC binary address bus commands. The function of the teletypewriter equipment TTY 244 is to transmit printed instructions to maintenance men and the like under control of binary address bus commands.

The function of group gate 235 is to control the operation of the position signal distributor 243, in response to the commands it receives from the binary address bus. These commands represent lamp information that is to be transmitted to a particular operator position to assist the operator in serving a call currently at her position. The position signal distributor is similar to the signal distributor 233 in that it comprises a relay tree translator which receives the group gate output signals and translates them into signals having the persistence required to operate or release magnetic latching relays in the position buffer circuits 208. Each position buffer circuit contains the relays required to control the lamp displays at its associated operator position.

Position scanner 242 transmits key information from the positions via the master scanner to the SPC regarding the state of each call currently connected to an operator position. Each position contains a plurality of keys which may be depressed by an operator to generate call information. This information may comprise numerical data, such as calling and called numbers; it may comprise call charge data signifying the type of service requested by the calling party; and it may also comprise call status information, such as for example, signals requesting the disconnection of the operator position from the call. Position scanner 242 is connected to each key in each position and, by virtue of these interconnections, it continually monitors the state of each key; in response to the depression of any key at any position, it transmits signals back to the SPC, via the master scanner, signifying the key that is depressed as well as the position in which the key is located. The position scanner is shown in detail in the Jaeger-Joel specification, as well as in the G. Riddell application, Ser. No. 537,224, filed Mar. 24, 1966.

The following describes, with reference to FIGS. 2, the manner in which the system of our invention serves a typical customer-dialed station-to-station type call that cannot be successfully completed when first attempted. A call of this type arrives at the TSPS center after the calling party dials the 3-digit area code, if required, followed by the directory number of the called station. The originating office responds to the dialing operation in the customary manner and completes a path therethrough to one of its outgoing trunk circuits, such as for example, 220–1 extending to the TSPS center. The seizure of this trunk circuit transmits a signal to the TSPS trunk circuit 203, to which it is permanently connected. The receipt of this seizure signal changes the state of the trunk scanner ferrod which monitors the incoming side of the TSPS trunk circuit. The SPC is programmed so that both the trunk scanner and the master scanner scan all the circuit points to which they are connected at a sufficiently high rate so that no information is lost during the interval between scans. Thus, a short time after the trunk scanner ferrod for trunk 203 changes state, the ferrod row in which it is located is scanned and the resulting information transmitted back over the scanner answer bus 240 to the SPC. The SPC, by means of its memory, identifies the trunk circuit associated with the ferrod that has changed state, analyzes the previous condition of this ferrod on the preceding scan to determine whether this is a new change of state, and determines whether the change of state signifies a newly arrived seizure signal.

Once the SPC determines that this is a new seizure signal, it utilizes memory to determine certain call parameters, such as for example, the calling and toll offices to which this trunk circuit is connected, the nature of the outpulsing that may be received from the local office, the nature of the signals that must be transmitted forward to the toll office, etc. Information of this type is commonly known as "trunk class information." It is stored on a permanent basis within the SPC memory for each trunk, and it permits the SPC to determine the service required on each call it serves.

The SPC derives the class of service required on the call from the trunk class information and transmits the necessary commands, via the CBT and the CPD, to the switching network, instructing it to interconnect the T and R conductor appearances of the calling trunk circuit appearance on the left side of network 204 with those of an appearance on a suitable digit receiver on the right side of the network. It is assumed that the information from the local office is to be received in MF form. Thus, the SPC now causes an MF receiver to be connected by the network to the trunk circuit. When the receiver is attached, the SPC transmits coincident signals via the CBT and the CPD to the signal distributor, instructing it to operate relays within the trunk circuit 203 and digit receiver 207, so that an acknowledgment signal is sent back to the local office in the form of polarity reversals on the T and R conductors. By means of this and subsequent polarity reversals, the SPC causes the MF receiver to transmit signals which cause the local office to outpulse the calling and called office information.

The call information outpulsed from the originating office is received by the TSPS trunk circuit 203 and extended over its T and R leads via the switching network to the MF receiver. This circuit receives the call information, one digit at a time, and, in response thereto, changes the magnetic state of a unique combination of master scanner ferrods to identify each digit. The master scanner scans all of its ferrod rows under SPC control and, in so doing, transmits serially back to the SPC, over the scanner answer bus, information signifying each digit outpulsed from the local office. After local office outpulsing is concluded, the SPC transmits commands to the switching network, instructing it to disconnect the receiver.

The SPC operates in response to the receipt of this information and transmits commands to the switching network instructing it to establish a connection between an idle outpulser 206 and the T1 and R1 conductor appearances of the calling TSPS trunk circuit on the left side of the links. These conductors are connected internally within the trunk circuit to its outgoing end extending via the OT and OR conductors to the toll office incoming trunk circuit 221–1. The SPC determines from its memory the type and quantity of the data that is to be outpulsed to the toll office, and it now transmits commands, via the CPD and the signal distributor, to control the outpulser so that call data is transmitted forward, digit by digit, via the switching network, the T1 and R1 conductors of the trunk circuit, the outgoing end of the trunk circuit, and the OT and OR trunk conductors to the incoming toll office trunk circuit 221–1. The toll office responds to this information in the conventional manner and establishes the forward connection to the terminating office and the called station. The switching network breaks down the connection between the outpulser and the TSPS trunk circuit following the termination of outpulsing.

If the called station is not busy and the called party answers, the call is served in the manner described in the Jaeger-Joel specification; and in connection therewith, the SPC monitors and times the call and retains within its temporary memory the information it has received from the local office, as well as that it has derived. The trunk scanner assists the SPC by transmitting information to it on every scanning cycle pertaining to the on-hook and off-hook condition of both the calling and called stations. The termination of the call is detected when either party goes on-hook, and at that time the required charge data for the call is recorded by the AMA recorder 214 operating under control of the SPC.

Let it be assumed, in order to describe the operation of our invention, that the call cannot be currently completed, either because the calling station is busy or because the calling party does not answer. The outgoing end of the TSPS trunk circuit 203– contains frequency selective filters connected to ferrods which together detect the busy and ringing tones that are transmitted back by the terminating office if the called station is busy or whenever ringing current is applied to the called line, respectively. The SPC is programmed so that a determination is made that the call cannot be currently completed in the event a busy tone is detected or in the event the called party does not answer following the application of ringing current cycles to his line for a predetermined time. The SPC at this time operates relays within the outgoing portion of the TSPS trunk circuit to release the forward connection. At the same time, it operates the switching network to interconnect the T and R conductor appearance of the trunk circuit with an idle appearance of the announcement equipment 252. Once this connection is established, the required signals are transmitted to the announcement equipment via the signal distributor and circuit path 254 to operate the announcement equipment so that a message is transmitted to the calling party informing him that the call cannot currently be completed and that if he desires to have it automatically retried, he should flash his switch hook and dial the digits specifying the time he desires the call to be retried. The network disconnects the announcement equipment at the end of the message.

Let it be assumed that the calling party desires to avail himself of this service and, in so doing, flashes his switch hook and dials the digits 10, signifying that the call is to be retried in ten minutes. The switch hook flash is detected by the scanner ferrod serving the incoming end of the trunk and, in response to the receipt of this signal, the SPC commands the network to interconnect the T and R conductors of the trunk circuit with an idle digit receiver. Once connected, the digit receiver receives the newly dialed digits 10 and transmits an indication thereof to the SPC via the master scanner. The digit receiver is disconnected following the receipt of these digits.

The calling party hangs up following the dialing of the digits specifying the time at which the call is to be retried and the entire circuit serving his initial call attempt is restored to normal so that it may serve other calls. The SPC stores the newly dialed digits together with the call information it has priorly received and derived. The SPC includes a clock which times the interval of delay following which the call is to be retried. This equipment is effective when ten minutes have elapsed for controlling the SPC to initiate a retry of the call in accordance with the customer request. At this time, the SPC selects an idle delayed call trunk circuit 249 and controls the operation of such a network to connect an idle outpulser to the T1 and R1 conductor appearance of the delayed call trunk circuit. At the same time, the delayed call trunk circuit is caused to transmit a seizure signal to toll office incoming trunk circuit 218–1. Subsequently, when the toll office is ready to receive call information, the outpulser transmits to it the information required to establish a connection back to the originating local office and the calling subscriber thereat. This connection, for example, may be established via outgoing trunk circuit 223–1, trunk 226–1, and incoming trunk circuit 230–1. The outpulser is then disconnected following the conclusion of its outpulsing operation and announcement equipment is connected to the same appearance of the delayed call trunk circuit.

The trunk scanner ferrod monitoring this end of the delayed call trunk changes state when the calling party answers. A signal to this effect is transmitted to the SPC at that time. The SPC now controls the announcement equipment, which transmits a message to the calling party stating that the call is about to be retried in accordance with his request. The announcement equipment is then disconnected and the outpulser is reconnected to the T1 and R1 conductors of the delayed call trunk circuit. At the same time, a seizure signal is transmitted forward to incoming toll trunk circuit 218–2. The outpulser transmits to the toll office the call information it requires to control the establishment of a connection forward to the terminating office and called station. The outpulser is then disconnected. If the called station is not busy and the calling party answers his phone, the call is completed in the manner described in the Jaeger-Joel specification. If the call is not successfully completed, such as for example, the called station is still busy or does not answer, the foregoing described procedure is repeated, with the calling party once again being advised by means of the announcement apparatus that the call will be automatically retried if he once again flashes his switch hook contacts and dials the required digits specifying the time the call is to be retried.

The foregoing described procedure may be repeated as many times as is required, either to successfully establish the call or until the calling party abandons the call.

TSPS TRUNK CIRCUITS—FIGS. 4 AND 5

The function of each TSPS trunk circuit, such as circuit 203 on FIG. 2A, is to extend a call from its local office appearance to its toll office appearance and, while so doing, temporarily bridge service circuits within the TSPS center onto the calling connection in order that certain call service may be more efficiently provided at the TSPS center than it may be at either the local or toll offices. Once this service is provided, the service circuits are disconnected and the calling and called stations remain connected for the call duration via the TSPS trunk circuit. The TSPS center monitors and times the call and restores the trunk circuit to its idle state upon the call termination.

FIGS. 4 and 5 disclose the circuit details of a TSPS trunk circuit arranged for MF signaling from the local office. FIG. 5 pictorially illustrates all the states of this trunk circuit in accordance with the principles set forth in the article entitled "The Method for Synthesis of Combinational Logic Circuits," by M. Karnaugh in the American Institute of Electrical Engineers Transactions, volume 72, pages 593 through 599, of November 1953. Each rectangle on FIG. 5 is designated to indicate the functional state of the trunk circuit at the time the relays are operated whose brackets encompass the rectangle. For example, the box numbered "7" and entitled "Coin Control and Ringback" indicates the state of the trunk circuit at the time relays A, B, and C are operated.

The trunk circuit of FIG. 4 is connected by means of its IT and IR conductors on its left side to the outgoing end of originating office 201 on FIG. 2A. On its right side, the trunk circuit is connected via its OT and OR conductors to the toll office 202. Its T, R, T1, and R1 conductors in the conductor group 404 extend to trunk link 204A on FIG. 2A. Conductors T and R extending to the trunk link permit the position side circuits (the right side) of the switching network to be connected to the incoming end of a calling connection. The T1 and R1 conductors permit the position side circuits to be connected to the outgoing end. Conductor group 405 connects the trunk scanner ferrods L and R to the appropriate points within the trunk circuit to monitor the DC potential states of the incoming and outgoing loops. The conductor group 406 comprise the circuit paths by which the signal distributor may apply signals to the magnetic latching relays A, B, and C to selectively operate and release them.

The following paragraphs described the detailed operation of this trunk circuit, together with a description of the circuit states it assumes during the serving of a coin call involving overtime. This description is with reference to the numbered circuit states shown on FIG. 5.

The trunk is in an idle condition prior to its seizure by the originating office. This state is numbered "0" and is designated "idle" on FIG. 5. The trunk assumes state 4 when its originating end is seized as the originating office attempts to extend a call forward to the toll office. This seizure signal comprises a D-C short across the IR and IT conductors at the originating office. The seizure of the IR and IT conductors energizes ferrod L, which transmits a seizure signal to the SPC which, in turn, commands the signal distributor to operate relay C over conductor SD2. The operation of relay C operates its transfer contacts connected to terminals 423 and 426 to reverse the polarity of the supervisory potential applied by the L ferrod to the IT and IR conductors.

The SPC next commands the switching network to connect the T and R conductors of this trunk circuit with a digit receiver of the MF type, as shown in FIG. 7. The SPC commands the signal distributor to operate relay B to put the trunk circuit into its HOLD state 6 when the connection to the MF receiver is established. The operation of relay B opens its make contacts to the left of terminals 425 and 426 to disconnect the path by means of which the supervisory potentials are applied to the IT and IR conductors by the L ferrod. The MF receiver at this time applies the required supervisory potentials to these conductors extending back to the originating office, as described in detail in the portion of the specification pertaining to the receiver. The called and calling station information is now outpulsed by the originating office to the MF receiver. When the outpulsing operation is terminated, the trunk reassumes its circuit state 4, in which relay B is released, leaving only relay C operated.

The SPC next establishes a link connection between the trunk T1 and R1 conductors and an MF outpulser which outpulses to the toll office the information it requires. The A relay is operated to put the trunk in its cut-through state 5 following the disconnection of the outpulser.

The incoming and outgoing portions of the trunk are now connected. The R ferrod is connected in series with the windings of inductance 1A, and it monitors the potentials applied to the OT and OR conductors by the toll office incoming trunk circuit. The polarity of these conductors is reversed when the called party answers. This reversal is detected by the SPC and is utilized to indicate the time at which the charging for the call is to commence.

A normal call termination is detected by the R or L ferrod and the SPC when either party hangs up. The SPC at that time releases trunk relay A to put the trunk circuit in its release forward state 4. This releases the forward connection. The trunk circuit is then transferred from its state 4 to its idle state 0 as relay C is released.

In order to illustrate the operation of our invention, let it be assumed that the called station is either busy or that the called party does not answer. The busy tone detector 432, together with the BT ferrod in the scanner, permits the system to detect the return of busy tone from a called station. Similarly, the ringing tone detector 433, together with the RT ferrod, permits the system to detect each application of ringing tone to the called line. The busy tone detector comprises an inductance 435, a diode bridge 436, together with a capacitor 437. The inductance and the capacitor are series resonant to the busy tone frequency and each application of busy tone to this OT and OR conductor changes the state of ferrod BT, which is in series with the inductance and the capacitor. The internal circuitry of the ringing tone detector 433 is the same as that of the busy tone detector, except that its inductance and capacitance are series resonant to the frequency of the ringing tone. This causes the RT ferrod to change state whenever ringing tone is returned from the called line.

The SPC abandons all further attempts to complete a call either immediately upon the detection of the busy tone or after ringing tone has been applied for a predetermined interval during which the called party does not answer. At that time, it releases relay A to transfer the trunk circuit from its cut-through state 6 to its state 4, in which only relay C remains operated. The SPC then connects the T and R conductors of this trunk circuit via the switching network with the announcement equipment, which operates to inform the calling party that his call cannot currently be completed and, if he desires to have it automatically retried, he should flash his switch hook and dial the digits specifying the time he wishes it to be retried. The announcement equipment is released at the termination of its operation, and the T and R conductors of the trunk circuit are connected to an MF receiver. Relay B of the trunk circuit is operated to put it in its HOLD state 6, and at this time the MF receiver supplies the necessary D-C control potentials to supervise the incoming connection. The MF receiver receives and passes to the SPC the digits subsequently dialed by the calling party specifying the time at which he desires the call to be retried. The MF receiver is subsequently released from the connection upon the termination of this dialing operation. The trunk circuit is transferred from its HOLD state 6 to its state 4, in which only its C relay is operated; and when the calling party hangs up, relay C is released and the trunk circuit is restored to its idle state 0 to await the serving of the next call offered to it.

DELAYED CALL TRUNK CIRCUIT—FIG. 6

The purpose of the delayed call trunk circuit (element 250 on FIG. 2A) is to permit the TSPS center to establish a connection between two priorly selected stations. Insofar as concerns its use in connection with our invention, it permits the subsequent establishment of priorly attempted calls which could not be successfully completed when first attempted. As has already been described, once the calling party desires to avail himself of the services provided in accordance with our invention, he flashes his switch hook and dials into the system the time at which he desires the call to be automatically retried. The system stores this newly received information, together with the call information it has priorly received, and then, upon the arrival of the specified time, attempts to complete the call. In so doing, the SPC seizes an idle delayed call trunk circuit, establishes a link connection between it and an outpulser which transmits the calling number to one of the two incoming toll trunk circuits individual to the delayed call trunk circuit. The toll office receives this information and, in the customary manner, controls the extension of a connection to the calling party. The outpulser is then disconnected and the calling party is connected via the delayed call trunk circuit to an announcement machine, which advises him that his call is about to be automatically retried in accordance with his request. The announcement machine is then released and the outpulser is connected to the delayed call trunk circuit to transmit forward the called station information to the other toll incoming trunk circuit associated with this delayed call trunk circuit. The toll office receives this information and controls the extension of a connection to the called station in the customary manner. The outpulser is then released. The call is served in the customary manner for its remainder, as described in the Jaeger-Joel specification, in the event that the called station answers. If a busy tone is once again encountered, or if the called station does not answer, the calling party is once again connected to an announcement machine and offered the opportunity of having his call automatically retried.

The details of the delayed call trunk circuit are shown on FIG. 6. The relays of this circuit are of the magnetic latching type and they operate and release in response to pulses received from the signal distributor. The IT and IR conductor pair extend to a first incoming toll office trunk circuit, as shown on FIG. 2A. The OT and OR conductor pair extend to a second toll office incoming trunk circuit. The T and R conductor pair 601 extend to a first appearance on the trunk link circuit and the T1 and R1 conductor pair 602 extend to a second trunk link appearance. The conductor pair 601 permits the position side circuits to communicate with one party on a delayed call via the IT and IR conductors extending to the toll office. The conductor pair 602 permits the position side circuits to communicate with the other party on a delayed call via the OT and OR conductor pair extending to the toll office. The D-C state of the IT and IR loop is monitored by the L ferrod, while the D-C state of the OT and OR loop is monitored by the R ferrod in the same manner as described for the MF trunk circuit. The IT and IR loop is normally utilized on a delayed call to establish a connection to the original calling station, while the OT and OR loop is utilized to establish a forward connection to the called station on the priorly attempted call.

The OT and OR loop is shunted by a busy tone detector 620, which is connected via conductor pair 621 to a BT ferrod in the scanner. The busy tone detector contains the same circuit elements shown in detail for the MF trunk circuit, and its function is to detect the return of busy tone from a called station. When the busy tone is detected, the magnetic state of the BT ferrod is changed to inform the SPC that the called station is busy. The OT and OR loop also contains a ringing tone detector 622 connected by conductor pair 623 to a RT ferrod. The function of these elements is to provide a signal to the SPC whenever ringing tone is applied to a called line. This permits the SPC to determine that the called station does not answer following the application of an arbitrary number of applications of ringing tone to the called line.

The outpulser is normally connected during the serving of calls to the T1 and R1 conductor pair 602. From there, this connection may be extended through the break contacts of relay B at terminals 613 and 614 and then through the break contacts of relay A to the IT and IR conductors extending to the calling station. Also, the outpulser may be connected via terminals 613 and 614 through the make contacts of relay B and the break contacts of relay C to the OT and OR conductors extending to the toll office incoming trunk circuit which controls the establishment of a connection to the called station. The announcement equipment is connected, when required, to conductors T and R and, via break contacts of relay A, to conductors IT and IR.

During the serving of a delayed call in accordance with our invention, an idle delayed call trunk circuit is seized when the SPC determines that the time has arrived to retry a call in accordance with a customer's request. An outpulser is then attached to the trunk circuit at its T1 and R1 conductor pair 602. This connection is extended through the break contacts of relays B and A to the IT and IR conductors at terminals 615 and 616. These conductors extend to the toll office incoming trunk circuit that is to be used to control the establishment of a connection back to the calling station. At this time, the SPC causes the outpulser to transmit the calling station digits to the toll office which, in response thereto, initiates the establishment of a connection extending to the calling office, and in turn the calling station. Relay B is operated following the conclusion of this outpulsing operation in order to disconnect the outpulser from this loop and to connect it to the OT and OR loop extending to the toll office preparatory to outpulsing called station information thereto. The announcement equipment is then connected to the T and R loop 601 and relay A is operated so that its make contacts will extend this connection via the IT and IR loop extending to the toll office. The announcement equipment transmits an announcement to the calling station stating that the call is now to be retried in accordance with his request. The announcement equipment is then released from the connection. Once the calling station answers, the outpulser transmits to the toll office, over the OT and OR loop, the information it requires to complete a connection to the called station. The outpulser is then released.

Relay C is operated following the disconnection of the outpulser. Relays A, B, and C of the trunk circuit are now all operated. This permits the L ferrod to monitor the incoming loop, the R ferrod to monitor the D-C state of the outgoing loop, and permits the BT and RT ferrods to detect whether busy tone or ringing tone, respectively, is received in the event the called station does not answer. If the called station answers, this is detected by the R ferrod and the call is then handled for its duration in the manner described in the Jaeger-Joel specification, with the TSPS center monitoring and timing the call and recording the required charge data therefor on its termination. If busy tone or a prolonged series of ringing tones is detected at this time, the procedure already described is repeated and the calling party is once again offered the opportunity of having his call retried automatically at a time specified by him.

MF RECEIVER—FIG. 7

The purpose of the MF receiver shown on FIGS. 2A and 7 is to receive and decode the information outpulsed from the preceding offices on MF calls. The MF receiver is connected by the switching network to the incoming side of the MF trunks via their T and R conductors. The received information is applied to the scanner which, in turn, transmits it to the SPC.

The MF receiver is shown in detail on FIG. 7 and comprises relays A, B, and C, which are controlled by the signal distributor; relay D, which is locally controlled; a switching network comprising the contacts of these relays for selectively applying different potential conditions to the T and R conductors; and an MF filter and frequency detector 705, which energizes various combinations of master scanner ferrods in response to the reception of the MF signaling frequencies.

Relay D is normally operated over an obvious path from ground on terminal 701 and break contacts of relays A and B. The A relay is operated by the signal distributor when a regular call is first extended to the MF receiver. This starts the slow-release of relay D. Following the operation of relay A, and up until the time relay D releases, a loop is closed from the incoming T and R conductors, through the make contacts of relay D, through the break contacts of relays C, B, and A, through windings 702 and 703 of transformer T1, to battery and ground via the windings of ferrod F0 in the master scanner. This potential condition lasts about 100 milliseconds and ends when relay D releases.

When the call initially comes into the TSPS center, the battery and ground potentials are supplied to the incoming connection by the incoming trunk circuit. At this time, only the C relay of the MF trunk circuit of FIG. 4 is operated and, in this state, the trunk circuit applies negative battery to the tip and ground to the ring. Subsequently, when the link connects the MF receiver to the connection, the polarity condition supplied by ferrod F0 prior to the release of relay D obviously must match that supplied by the trunk. This condition is matched by the MF receiver so long as its D and A relays are operated, and at this time the F0 ferrod applies negative battery to the tip and ground to the ring. The trunk potential source is disconnected from the T and R conductors by the operation of its relay B when the MF receiver is attached. At the termination of the aforementioned 100-millisecond release interval for relay D of the MF receiver, only the MF receiver supplies potentials to the tip and ring conductors of the incoming connection. When relay D releases, this potential condition is reversed so that battery is then supplied to the ring lead R while ground is supplied to the tip conductor T. This polarity reversal signals the outpulser in the originating office that the TSPS center is ready to receive digits. At this time, a loop is closed for the T and R conductors and comprises the break contacts of relays D, C, and B, in that order, the make contacts of relay A, and the windings of transformer T1, to the F0 ferrod.

The originating office now outpulses MF call information to the TSPS center, which, in turn, applies it via the switching network to the T and R conductors of the MF receiver. These received frequencies are extended via the windings of transformer T1, through capacitors C7 and C8, to the input of the filter and frequency detector network 705. This circuit filters the received MF signals into their component frequencies and applies each filtered frequency to a detector individual thereto. The output of each frequency detector is connected to one of output conductors F1 through 46 within the conductor group 720. Each detector operates in such a manner that it reduces the output current to its ferrod in response to the reception of its associated frequency. This, in turn, changes the magnetic condition of its ferrod from a saturated to a non-saturated state.

The terminal 710 output of the MF filter and frequency detector 705 applies a signal, when MF frequencies are received, to conductor 709 extending to the frequency check circuit. This circuit checks that the signals currently received by circuit 705 comprise at least two of the basic six MF frequencies and, if the check condition is met, an output signal is applied from this circuit to the input of the 20-millisecond delay circuit 707 whose output is connected to the FC ferrod. To prevent voice simulation of MF digits, the response of the FC ferrod to the reception of a valid MF digit is delayed for 20 milliseconds. Once the FC ferrod is switched, it is held in that state for 20 milliseconds after the two frequencies cease. This is done to prevent the FC ferrod from following any noise pulses which may affect the frequency detector output and causing the SPC to recognize these pulses as the start of new digits. The SPC does not scan ferrods F1 through F6 until it first detects that the FC ferrod has switched, which switching occurs 20 milliseconds following the reception of a valid signal. Once the SPC determines that the FC ferrod has switched, it then scans ferrods F1 through F6 to identify the MF digit currently received. These six ferrods are not scanned again by the SPC until it detects that the FC ferrod has restored to its normal condition (20 milliseconds after the digit reception has ceased), and then, in response to the reception of the next MF digit, has once again reverted to the magnetic state it assumes during the receipt of a valid MF signal.

This mode of operation, wherein the SPC scans the FC ferrod prior to scanning the six ferrods associated with the MF frequencies, is used to detect the beginning and end of a valid MF digit. It also prevents the SPC from receiving false information as a consequence of two of ferrods F1 through F6 being momentarily switched because of noise for a few milliseconds. It also prevents false information from being received during a condition in which valid MF information is received but, due to noise, the magnetic state of the frequency ferrods is momentarily switched to an idle condition and then returned to a signal-present condition. If it were not for the manner in which the FC ferrod is repeatedly scanned, the SPC might construe such a condition to represent the reception of two successive MF digits, rather than the continued reception of a single digit.

The SPC keeps track of the digits received for the called number, including the area code, if any; and when the START signal is received for the called number, it operates relay B to apply another polarity reversal from ferrod F0 back to the originating office to signal it to proceed with the ANI outpulsing. Next, the ANI digits are received, and following this the A relay is released by the signal distributor. At that time, audible tone is provided back to the originating office from tone circuit 706. The SPC then restores the MF receiver to normal by releasing the B relay to reoperate the D relay.

The circuits work in the following manner for the reception of a dial pulse—ANI call. On calls of this type, the MF receiver is utilized only to receive the ANI information for the calling office. Relays C and then A are operated by the signal distributor when the calling connection is extended through the switching network to the T and R conductors of this circuit. Relays A and C provide ground on the tip and battery on the ring from ferrod F0. This matches the TSPS trunk polarity. The trunk is then bypassed and relay B is operated to reverse trunk polarity as a signal to start outpulsing in the originating office. Following the outpulsing operation, relay A is released to provide audible tone back, and finally relays B and C are released to restore the circuit to normal and operate relay D.

The MF receiver is also utilized in accordance with our invention to receive the digits dialed by the calling party specifying the time at which a call is to be automatically retried by the system in the event it cannot be completed when first attempted. The trunk circuit of FIG. 4 is in its release-forward state 4 at this time, with only its C relay being operated. When in this state, it applies a negative battery to the tip and a ground to the ring. The MF receiver is attached to the T and R conductors of the trunk circuit following the disconnection of the announcement apparatus and, when it is attached, it is necessary that the potentials applied by it to the T and R conductor match that currently being applied by the trunk circuit itself. There is no need for the timed polarity reversal on this usage of the MF receiver, as is the case when the receiver is connected to receive the automatically initiated outpulsing from the originating office. At this time, the MF frequencies are transmitted by the calling party manually as he depresses pushbuttons on his call set, rather than automatically by the central office in response to polarity reversals. Therefore, when the MF receiver is attached to the T and R conductors of the trunk circuit, its relays A, B, and C are operated, with the operation of relay C maintaining relay D operated. This configuration of relays operated maintains battery on the tip and ground on the ring from the winding of the F0 ferrod. The receiver now receives and decodes the frequencies comprising the digits dialed by the calling party specifying the time he desires the call to be retried. The MF receiver is released from the call upon the conclusion of this dialing operation, and at this time its relays A, B, and C are released by the signal distributor.

MF OUTPULSER—FIGS. 8–10

The purpose of the outpulsers shown on FIG. 2A is to transmit forward to the toll office the information it requires for serving calls. The outpulsing operation is controlled by the SPC, which transmits commands to the signal distributor and the CPD to cause those circuits together to control the operation of the outpulser so that the required called station information is outpulsed.

FIGS. 8 through 10, when arranged as shown in FIG. 11, disclose the circuit details of an outpulser of the MF type. As its name implies, this circuit transmits called station information forward to the next office by utilizing MF signaling, with each digit being represented by the simultaneous transmission of a unique pair of frequencies. The MF outpulser shown on these figures may be broadly and functionally subdivided into: (1) the circuitry of FIG. 8, which discloses the MF frequency generators and the means by which two out of six frequencies at a time may be applied via the switching network to the outgoing connection, (2) the circuitry of FIG. 9 which comprises flip-flops for receiving signals from the CPD indicating the frequencies to be outpulsed for each digit and which also comprises the relays operated by the flip-flops for controlling the circuitry of FIG. 8 so that the appropriate MF frequencies are applied to the outgoing connection for each digit, and (3) the circuitry of FIG. 10 which times the duration the MF signals representing a digit are applied and which also times the interdigital intervals.

The individually indicated frequency sources within frequency generator 801 generate the plurality of frequencies required for MF signaling. These frequencies are applied selectively, two at a time, via the contacts of the S- relays, to the T1 and R1 conductors, via the winding of transformer T1. The T1 and R1 conductors, in turn, are connected, via the switching network and the outgoing portion of the trunk serving the call, to the forward connection extending to the next office. Ferrods 808 and 809 monitor the polarity of the potentials applied to the T1 and R1 conductors. Ferrod 810 provides an indication of the current status of the circuitry local to the outpulser.

The signals indicating the frequencies to be outpulsed for each digit are received from the CPD by the plurality of flip-flops 917. Each flip-flop is normally in a RESET state, in which its 0 output is high (+24 volts) and its 0 and its 1 outputs low (ground). The 0 output of each flip-flop is connected to a relay individual to the flip-flop. The other side of each relay winding is connected to 24 volts. With this arrangement, a relay is normal when its flip-flop is in a RESET state and is operated when a flip-flop is set, since at that time the 0 output of the flip-flop to which the relay is connected is at ground. Each flip-flop and, in turn, each relay connected to a flip-flop, is individually associated with one of the basic MF frequencies within the frequency generator 801. The flip-flops, the relays, and the individual frequency sources within 801 are designated in a manner so as to facilitate an appreciation of the correspondence between each. Thus, flip-flop 917-7 is individual to relay S7, and both of these, in turn, are individual to frequency source 700 within the frequency generator 801. The remaining flip-flops and the remaining S- relays of FIG. 9 are individual to the remaining frequency sources in a similarly designated manner. The setting of a flip-flop operates its S- relay, which, in turn, closes contacts of the relay on FIG. 8 to connect its individual frequency source to either the T1 or R1 conductors. Thus, the setting of flip-flop 817-7 operates relay S7, which closes its make contacts to apply the 700-cycle frequency source to the T1 conductor via the winding of transformer 811. Similarly, the setting of flip-flop 817-9 operates relay S9, which closes its make contacts to apply the 900-cycle frequency source, via the windings of transformer 811, to conductor R1.

When the SPC determines that an outpulsing operation is required, it selects the outpulser that is to be utilized and, assuming the outpulser of FIGS. 8 through 10 to be used, it commands the signal distributor to apply a signal to the SDG and SDOO conductors of FIG. 8 to operate relay A and, at the same time, commands the switching network to close a path to interconnect the T1 and R1 conductors on FIG. 8 with the correspondingly designated conductors of the trunk serving the call. Relay A is magnetic latching and remains operated in response to the signal received from the signal distributor. The polarity of the potentials applied to the T1 and R1 conductors at this time is such that negative battery is applied to conductor R1 and positive ground is applied to conductor T1. This polarity condition energizes ferrod 808 through windings 806 and 807 and diode CR16. Subsequently, the toll office reverses the polarity applied to these conductors when its MF receiver is attached to the connection. At this time, ground is on the ring conductor R1 and negative battery is applied to tip conductor T1. This change of polarities also energizes ferrod 809, via diode CR8. This reverse polarity condition constitutes a GO signal indicating that the tandem office is ready to receive data.

The SPC, with the assistance of the scanner, monitors the state of ferrods 808 and 809 and, when it determines that the START signal has been received, it transmits commands to the CPD, instructing it to set the 917- flip-flops, two at a time, to operate their associated S- relays, two at a time. This, in turn, applies the various MF frequencies from frequency generator 801, two at a time, to the T1 and R1 conductors to transmit the called information forward to the tandem office.

The first signal that is sent out on any outpulsing operation does not comprise one of the digits of the called office or its area code, but instead, comprises what is known in the art as a KP pulse. The KP pulse comprises frequencies 1700 and 1100, and its function is to prepare the MF receiver within the toll office for the reception of the information about to be outpulsed. The CPD commands for the KP signal comprise signals which set flip-flops 917-7 and 917-11-. This operates relays S17 and S11 to apply the 1700- and 1100-cycle frequencies to the T1 and R1 conductors.

Relay K is operated from ground on terminal 908 via the 2/6 check circuit 907 whenever the input information is good, i.e., in 2/6 form. Check circuit 907 may comprise a 2/6 symmetric composed of the contacts of relays S- on FIG. 9. The K relay, in operating, opens its break contacts connected to battery terminal 1001 to remove battery from the left side of resistor R5 at terminal 103. Relay S17, in operating, opens its break contacts to isolate terminal 1005 from the terminal 1004 positive 24-volt potential. The operated state of both relays K and S17 at this time, by virtue of their break contacts, permits the upper plate of capacitor C1 at terminal 1002 to start charging positive to the 24-volt potential at terminal 1007 through resistors R4 and R1. The potential on the upper plate of capacitor C1 rises sufficiently positive after approximately 60 milliseconds to turn transistors Q1 and Q2 on and, in turn, operate relay DG1.

The operation of relay DG1 opens its break contacts on FIG. 9 to remove the positive 24-volt potential at terminal 901 from the plurality of flip-flops 917-, thereby resetting the two flip-flops that are currently set (in this case, flip-flops 917-11 and 917-47) and, in turn, releasing their associated relays S11 and S17. The release of these two relays destroys the 2-out-of-6 check and releases relay 83–K. The release of this relay closes a path to operate relay 10–DG2 through the make contacts of relay DG1. The operation of relay DG2 terminates the application of the MF signals to conductors T1 and R1 by opening its break contacts on FIG. 8 to isolate the resistors R2 and R3 from the frequency sources within frequency generator 801. The operation of this relay also closes its make contacts on FIG. 8 to close a path to energize ferrod 810 as a signal to the SPC that the KP signal has been outpulsed and that the information for the next digit to be outpulsed may now be received. Simultaneously, the operation of relay DG2 closes its make contacts on FIG. 9 to reconnect the battery supply 901 to all of the flip-flops 913, thereby preparing them for the receipt of additional information from the CPD.

Relay DG2, in operating, also closes a path through its make contacts connected to terminal 1010 to charge the top plate of capacitor C1 negatively via resistor R5 and diode CR2. This turns transistors Q1 and Q2 off and releases relay DG1. The operation of relay DG1 also opens its break contacts connected to terminal 1010 to remove negative battery on terminal 1001 from the left side of resistor R12 to permit the top plate of capacitor C2 to start charging in a positive direction through resistor R8 to the terminal 1009 24-volt potential. After a predetermined time, the charge on capacitor C2 becomes sufficient to turn transistor Q3 on, which, in turn, attempts to turn on transistor Q4. However, transistor Q4 cannot turn on until its emitter is connected to the terminal 1011 ground. The circuit for connecting its emitter to ground includes make contacts of relays DG2 and relay K. Relay DG2 is operated at this time. However, the make contacts of relay K are open, since relay K does not operate until the 2-out-of-6 check has taken place, when the signal for the next digit to be outpulsed is received from the CPD. Thus, this make contact of relay K prevents transistors Q3 and Q4 from turning on and, in turn, prevents relay DG3 from operating until the flip-flops have received the data for the next digit and, in turn, have operated two of the S- relays which, in turn, permits relay K to operate. The operation of relay K at this time closes its make contacts to permit transistors Q3 and Q4 to turn on and operate relay DG3. The operation of relay DG3 opens its break contacts to release relay DG2, which, in turn, closes its break contacts on FIG. 8 to permit the MF generator to apply the appropriate frequencies forward to the next office. The operation of relay K closes its make contacts on FIG. 8 to short out resistor R1, thereby de-energizing ferrod 810 as a signal that a valid digit has been received.

Relay DG2, in releasing, closes its break contacts connected to terminal 1010 to restore a negative charge to the top plate of capacitor C2 to turn off transistors Q3 and Q4 and, in turn, release relay DG3. The make contacts of relay DG2 in the emitter circuit of transistor Q4 now release and speed up the release of relay DG3. The operation of relay K starts the operation of the top half of the timer on FIG. 10, as already described for the reception of the KP signal.

The signal distributor releases relay A on FIG. 8 when the outpulser has completed its function on a call. The release of this relay places the negative 48-volt potential from terminal 1001 on the top plate of capacitor C1, via diode CR2 in resistor R5. This turns off transistors Q1 and Q2 and releases relay DG1. The release of relay D also opens its make contacts to remove ground from the right side of the winding of relay DG2 to release it. This restores the entire circuit to normal.

The timing requirements within the MF receiver of the tandem office are such that the KP signal must be received for approximately 100 milliseconds, while the other signals need be received for only 67 milliseconds. This change in timing is controlled by charging capacitor C1 on FIG. 10 to a positive 24 volts, either through resistors R1 and R4 in series or just through resistor R4. The longer timing is provided when the capacitor charges through both resistors. This occurs when relay S17 is operated and opens its make contacts to isolate the terminal 1004 potential from terminal 1005. Relay S17 is operated for the transmission of the KP signal and, at that time, it removes the terminal 1004 potential and forces the capacitor to charge through both resistors R1 and R4. The make contacts of relay S15 connected to terminal 1004 are provided to provide for a shorter timing interval for the START signal which utilizes both relays S17 and S15.

In summary, regarding the nature of the timing function provided by the upper half of the circuit of FIG. 10, the timing starts when relay K operates as two of the S- relays operate. At this time, the MF signal is applied forward. Timing then proceeds and the MF signal remains applied for the required duration determined by either resistor R1 and/or resistor R4 on FIG. 10. Once capacitor C1 charges to the required potential, it turns on transistors Q1 and Q2 to operate relay DG1. Relay DG1 removes battery from the flip-flops to release the two S- relays which, in turn, release and remove the MF transmission forward.

STORED PROGRAM CONTROLLER (SPC)—
FIGS. 12, 13, 14A–14C, 15

The SPC, shown as element 230 on FIG. 2B, comprises a stored program machine having a processor 230A and a memory 230B. The memory stores both program instructions and data. All instructions, and some data, are stored on a relatively permanent basis and are changed only infrequently from time to time. Other of the data is relatively temporary in nature, and it may be entered into memory, modified, and erased during the serving of a call. The program instructions form the entirety of the vocabulary of the processor, and they provide the intelligence necessary to instruct the processor in the many functions required of it under any of the many call situations the SPC may encounter. The processor monitors and controls peripheral equipment by performing logic and/or arithmetic operations on data temporarily stored in registers within it, under control of the programmed instructions, and by transmitting to the peripheral equipment output information or commands generated while performing these operations. Although the processor may perform many different functions, it is capable of executing only one instruction at a time under control of the programmed memory.

The SPC, in performing its functions, either directly or indirectly, controls the operation of every circuit in our system. All commands specifying an operation in another circuit originate within the SPC and all answers signifying the existing operational state of many circuit points within the system are returned to the SPC. Certain instructions result in actions which are entirely confined within the SPC. For example, an instruction or series of instructions may command the SPC to perform logic and/or arithmetic operations on the data currently contained within it. Other instructions may cause the SPC to command a peripheral circuit to perform an operation which results in an answer being transmitted back to the SPC via the scanner. An instruction, for example, may result in a command being sent to the scanner to read or interrogate a specified row of ferrods. The result of the interrogation is transmitted over the scanner answer bus back to the SPC, where the information is stored temporarily either in memory or in index registers within the processor until it can be later utilized.

The SPC communicates primarily with the CBT (communication bus translator), the CPD (central pulse distributor), and the scanners. The output signals of the SPC are commonly referred to as "commands" since they cause the circuit receiving them to perform the operation specified by the command. The commands transmitted to the CBT are applied over circuit paths 247 and 248 and they instruct the CBT to apply its own output commands to the address buses which, in turn, transmit them to the peripheral circuits to which they are connected. The SPC output commands are received by the CPD over circuit paths 210 and 212 and they instruct the CPD to unlock the receiving portion of a specified peripheral circuit in order that it, and only it, may receive and register the command currently on the address bus to which the specified peripheral circuit is connected.

The scanner answer signals are transmitted over the scanner answer bus 240 back to the SPC. The information represented by these signals signifies the current state of many circuit points within our system. Each such circuit point is associated with an individual ferrod in the scanner and the plurality of ferrods within a scanner are divided into rows. When the SPC desires to obtain information regarding the state of a specified circuit point, it causes commands to be transmitted to the scanner, which instructs it to interrogate the ferrod row containing the ferrod individual to the specified circuit point. The scanner answer transmitted to the SPC as the result of this interrogation represents the existing state of the specified circuit point as well as all of the other circuit points individual to the remainder of the ferrods in the interrogated ferrod row.

Figure 12:
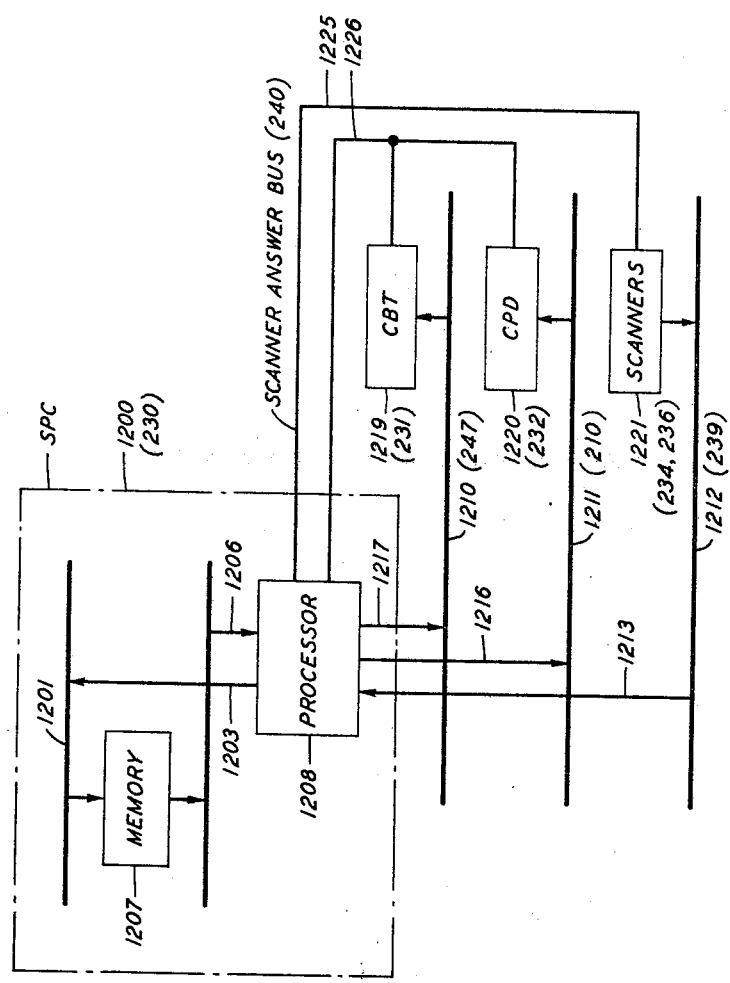

FIG. 12 discloses in greater detail the relationship between an SPC 1200 and the circuits with which is communicates. The SPC comprises processor 1208 and memory 1207. The processor retrieves either data or instructions from memory by a read operation and it enters information into memory by means of a write operation. The input bus for memory 1207 is element 1201; the output bus is element 1202. The lower portion of FIG. 12 discloses CBT 1219, CPD 1220, and a plurality of scanners which are represented generally as element 1221. The processor transmits commands to the CBT over bus 1210 and to the CPD over bus 1211. It receives information from the scanners over bus 1225 and from the CBT and CPD over bus 1226. Additional details of the SPC are shown on FIG. 13. This figure discloses a processor 1301, a memory 1302, the circuit paths interconnecting these two elements, as well as the circuit paths interconnecting the processor with circuits external to the SPC.

Memory 1302 is functionally subdivided into a plurality of portions designated A, B . . . n, each of which stores the program and data required to enable the SPC to perform the many separate functions required for the operation of our system. The Memory Read and Write Control Circuit 1305 within the processor controls the operations required to read data and instructions out of and enter data into memory. The information to be written into memory is applied to it over bus 1304 from the output of circuit 1305. Similarly, the information that is read from memory is applied by means of bus 1303 to circuit 1305. Each portion of memory is represented by an address, as is typical in stored program machines, and therefore in performing each read and write function, circuit 1305 obtains the address of the pertinent portion of memory from address generator 1307 over path 1306. The memory access register MAR, shown as element 1310, transmits to the MAR the information that is to be entered into memory on write operations, and on read operations it receives from the MAR the information extracted from memory. The information the MAR receives from memory on a read operation is transmitted to other elements (not shown) within the processor over path 1311. Similarly, the MAR receives from these other elements the data that is to be entered into memory on a write operation over path 1312.

Since the details of the processor comprise no part of out invention, many of the elements with which the MAR communicates are shown only functionally. However, included in the processor is the circuitry required to operate upon and manipulate the data stored within it so that both logic and arithmetic operations may be performed. This circuit is represented generally by the box entitled "Arithmetic and Logic Circuit" and shown as element 1317.

The index registers 1314 cooperate with the arithmetic and logic circuit to perform arithmetic and logic operations upon the data received by the processor both from memory and from circuits external to the SPC. The index registers are also used to receive and register temporarily the scanner answer information. This information is received over path 1318 and, once received, it is stored within the index registers until it may be acted upon and then either entered into memory, utilized for other purposes, or discarded. Checking circuit 1316 receives the various check signals, parity signals, all-seems-well signals, and other signals which must be received by the SPC in response to the various commands it transmits to other circuits before it proceeds with another command. The output commands generated by the SPC are applied to external circuits by the circuit entitled "SPC output steering and control circuit" and designated as element 1320. Cable 1321 transmits commands from the SPC to the CBT, cable 1322 transmits commands from the SPC to the CPD; and cable 1323 transmits WRMI pulses to the circuits requiring them.

The SPC is shown primarily in diagrammatic form on the present drawing figures, including FIGS. 2B, 12, 13, and 14, since its details comprise no portion of the present invention and since stored program controllers suitable for use in our invention are disclosed elsewhere. For example, the aforementioned Doblmaier et al. application discloses in complete detail a stored program controller which may be utilized to generate the control signals required to operate the circuits of our invention. The Doblmaier et al. stored program controller is further described in complete detail in the aforementioned Bell System Technical Journal of September 1964, which issue is devoted in its entirety to an electronic switching system and with approximately 50 percent or more of this issue being devoted to details of the stored program controller. Also, if desired, a stored program controller whose processor is shown in Kettley et al. application, Ser. No. 422,313, filed Dec. 30, 1964, now Patent No. 3,370,274, issued Feb. 20, 1968, may be utilized instead of the one shown in detail in Doblmaier et al. Since the details of stored program controllers suitable for use to generate the signals required by our system are shown in detail in the prior art, the disclosure of the present specification has been simplified by disclosing only those details of an SPC as are required for an understanding of our invention.

Figure 13:
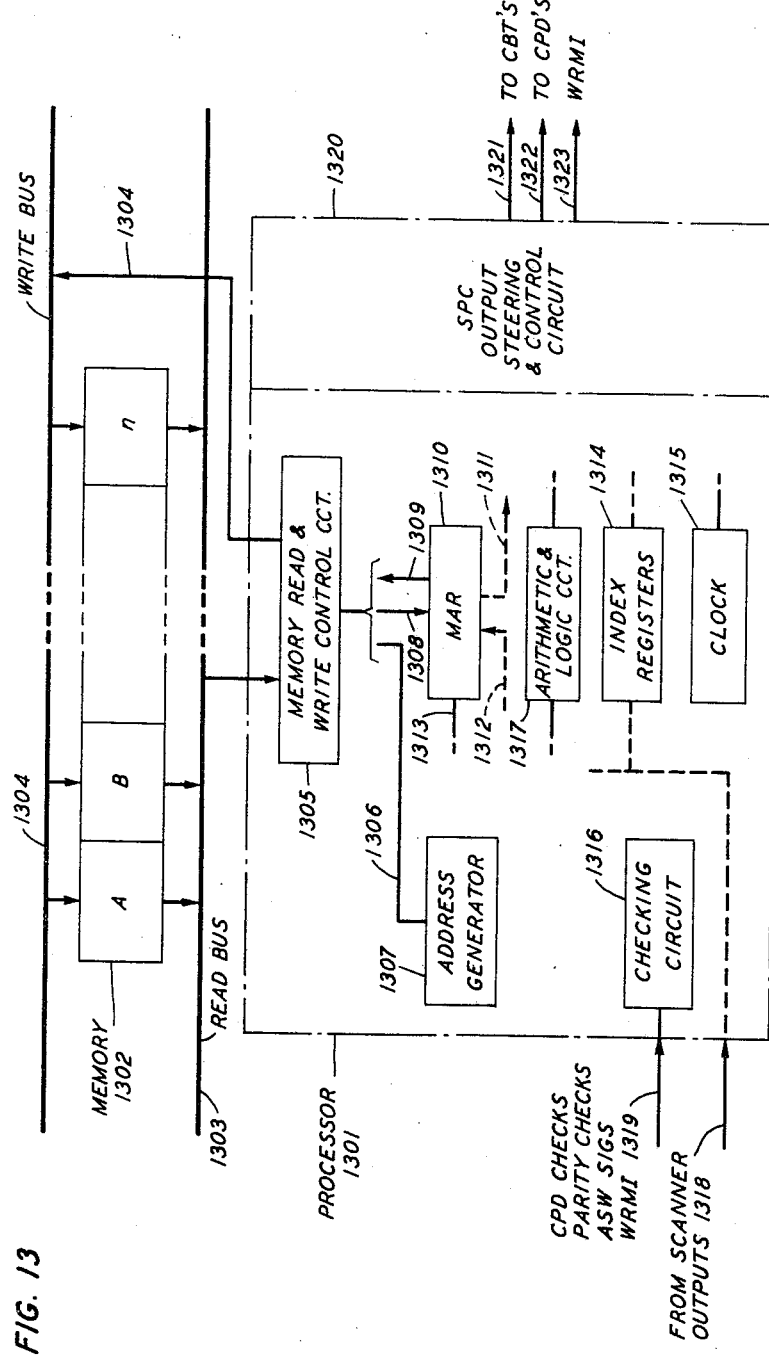

On FIG. 13, the SPC memory is divided into a plurality of elements designated A, B . . . through n, each of which stores the data or information pertaining to a different operation the SPC may perform. Each memory element is connected by a separate path to a write bus 1304 positioned atop the memory and to a read bus 1303 positioned underneath the memory. The processor effects a write operation by simultaneously gating onto the write bus the address of the portion of memory that is to be written into, together with the information that is to be written. Similarly, the processor effects a read operation by gating onto the read bus a read command together with the address of the portion of memory that is to be read.

Figure 14A:
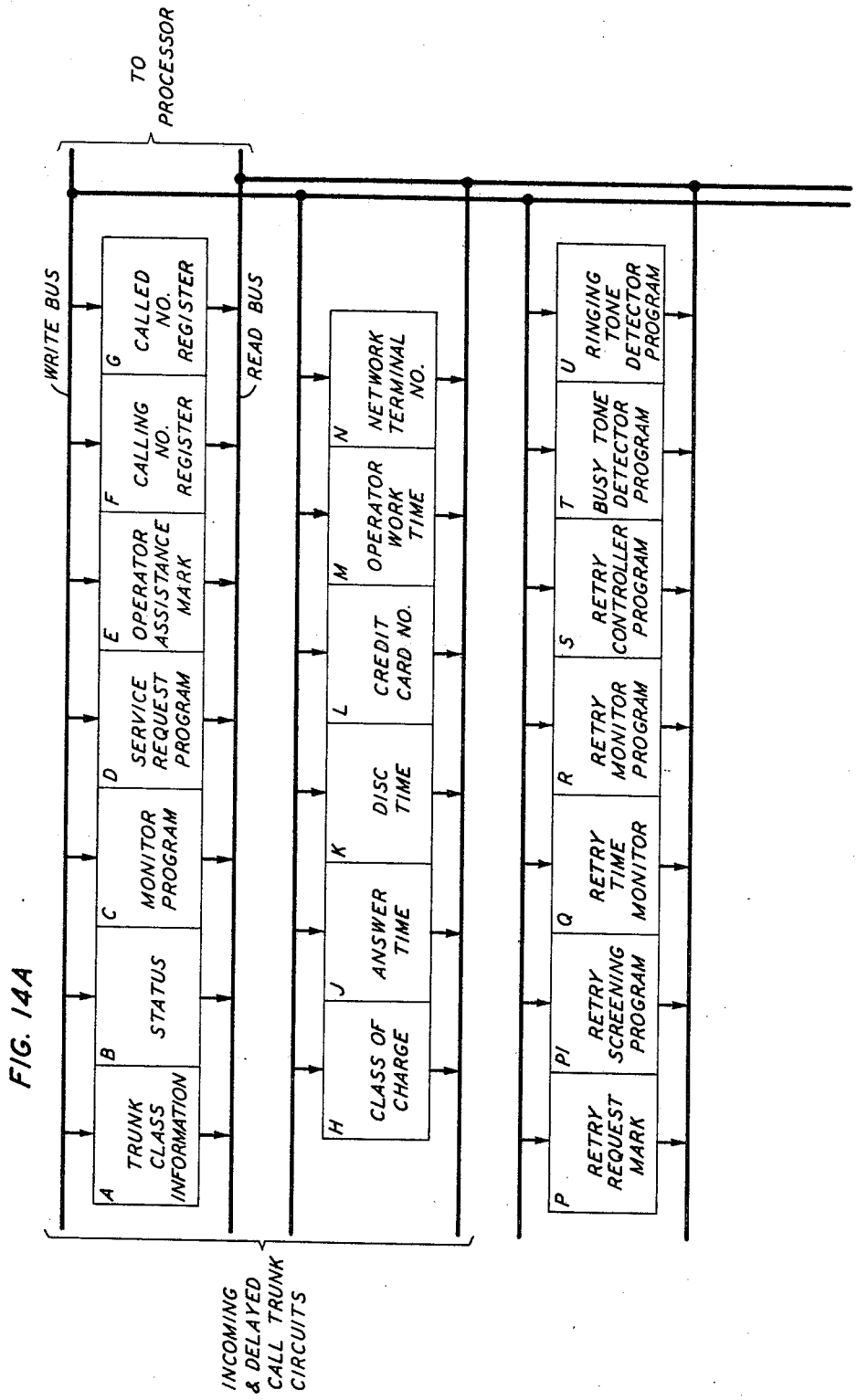

FIGS. 14A through 14C, when arranged as shown on FIG. 15, disclose additional details regarding the manner in which the memory may be subdivided by its call-serving functions. The memory elements are arranged into a plurality of rows on FIGS. 14. Write bus 1304 and read bus 1303 extend vertically on the right side of these figures. A branch of the write bus extends horizontally atop each memory row, and each such branch is connected by the indicated arrowed paths to each section of memory in its row. Similarly, a branch of the read bus extends horizontally beneath each row, and each branch is connected by the indicated arrowed paths to each memory section in its row. These interconnections permit the processor to read and write into any portion of memory in the same manner as described in connection with FIG. 13. The connections to the processor are shown in the upper right-hand corner of FIG. 14A.

The top row represents the memory elements associated with the TSPS trunk circuits and their control. Element A is entitled "trunk class information" and stores the many parameters pertaining to each trunk circuit, including the class of calls served thereby. Element b is entitled "status" and registers information signifying the status, i.e., busy or idle, of each trunk circuit. Element C comprises the trunk monitor program and governs the operation of the SPC in controlling the trunk circuits. The service request program D enables the SPC to determine the initiation and termination of service requests by the trunk. Memory E stores a mark indicating whether or not operator assistance is required on calls served by each trunk circuit. Element F comprises the calling number register for each trunk circuit while element G comprises the called number registers. Memory element H stores class-of-charge information. Element J stores the answer time and element K stores the disconnect time for each trunk circuit. Element L stores the credit card number for credit card calls. Element M stores the operator work time. The operator work time is subtracted from the total time of the call in order to derive the true chargeable time. Element N stores a number indicating the network appearance of each trunk circuit on the switching network.

Element P is the first of the elements pertaining to the call retry facilities and it stores a mark signifying whether or not a customer desires his call to be automatically retried at a later time. Element P1 analyzes the call information to determine whether the call spans a distance sufficient to entitle it to automatic retry service. Element Q times the duration following which each call is to be automatically retried. Element F comprises the retry monitor program while element S comprises the retry controller program. Element T comprises the program which controls the operation of the SPC whenever busy tone is detected while element U comprises the program that is utilized whenever ringing tone is detected.

Element V stores the status information for the announcement equipment, element W comprises the controller program for the announcement equipment, while element X comprises the network terminal number for each appearance of the announcement equipment. Element Y is the beginning of the portion of memory pertaining to the outpulsers and it stores the outpulser status information. Element Z comprises the controller program while element AA comprises the digit translation program. Element AB determines the digits to be outpulsed while element AC stores the network appearance information for each outpulser. Element AD stores status information for the digit receivers while element AE comprises their controller program. Element AF comprises a program which translates the digits received into binary forms suitable for storing in memory, and element AD stores information signifying the network appearance of each digit receiver.

Element AH is the first portion of memory pertaining to the switching network and it stores the network map. Element AJ stores the network path memory information, i.e., information pertaining to the established connections in the network. Element AK comprises the overall control program for the network while element AL comprises the control program for the AMA equipment.

Element AN comprises the end-of-call time and charge register. Element AP comprises the end-of-call time and charge controller program, element AQ comprises the program which controls the operation of the CBT while element AS controls the operation of the CPD. Element AT controls the signal distributor while element AU controls the analyzation of the scanner answer information. Element AV permits the SPC to perform the necessary checks on the input information it receives from various circuits, element AW comprises the portion of the memory which controls the operation of the teletypewriter equipment while element AX comprises a clock which generates the necessary timing signals required by the SPC in the various circuits of our system.

The indicated subdivided portions of memory discussed represent only a few of the many thousands of items of information and instructions that must be entered into memory in order for the SPC to perform its required functions. The nature of these functions and their specific detail comprises no portion of the present invention and further, they are described in detail in the aforementioned Jaeger et al. and Doblmaier et al. specifications as well as in the aforementioned issue of the Bell System Technical Journal pertaining exclusively to an electronically controlled switching system.

ANNOUNCEMENT APPARATUS—FIGS. 16 and 17

FIGS. 16 and 17 show two different alternative embodiments of the announcement apparatus diagrammatically shown as element 152 on FIG. 1 and element 252 on FIG. 2B. The embodiment of FIG. 16 utilizes a plurality of separate prerecorded announcement tracks, each of which contains a complete message. The embodiment of FIG. 17 utilizes a plurality of prerecorded magnetic tracks, each of which contains less than a complete message. The message that is to be transmitted to a calling station is synthesized by connecting selected tracks in a required timed sequence to the calling connection.

Shown on FIG. 16 is the announcement equipment 1601, having a plurality of prerecorded tracks 1 through n, each of which is connected to an individual appearance on the position link by means of separate conductors 1602–1 through 1602–n. The announcement equipment is controlled in its operation by an announcement controller 1604, which is connected to the signal distributor by conductors 1603. The signals applied to this conductor by the signal distributor permit the controller to control the required operations of the announcement equipment, such as for example, its starting and stopping, etc. Each of tracks 1, 2, through n, contains a complete message that is different, of course, from the message on any other track. The plurality of tracks together contain all the messages required for any call that might be served at the TSPS center. The SPC determines the particular track to which a call is to be connected, in accordance with the call information it has received and derived.

Although, normally, the message on each track would be different from that on any other track, this may not always be the case for tracks containing messages that are relatively long. It is, of course, necessary that each call be connected to a track at the time the message thereon is about to begin, and thus, in instances where a message is relatively long, in order to reduce the call waiting time, the same message would be recorded on a plurality of track, spaced apart timewise, so that each call requiring such a message could be connected to a track containing it with a minimum of delay.

FIG. 17 discloses announcement equipment 1701, comprising a plurality of prerecorded tracks, 1 through n, each of which is connected over individual ones of conductors 1702–1 through 1702–n to the right side of an announcement link 1703. This link comprises a switching network of the type shown for the trunk and position links on FIG. 2A. The left side of the announcement link is connected over separate conductors, 1704–1 through 1704–n, to individual appearances on the position link 204B of FIG. 2. The announcement link is controlled in its operation by controller 1705 which is connected over conductor 1706 to master scanner 236, over conductor 1707 to the central pulse distributor 232, and over conductor 1708 to the 1/N address bus 239. The starting and stopping of the recorded announcement tracks are controlled by controller 1709 in response to signals received from the signal distributor over conductors 1710.

The equipment arrangment shown on FIG. 15 synthesizes each message that is transmitted to a calling station. The component parts of the message, such as syllables, words, or a plurality of words, are recorded on the different ones of tracks 1 through $n$. In the manner well known in the art, the link 1703 operates under control of signals received from the central pulse distributor and the $1/N$ address bus to connect a calling connection to the announcement track in a required timed sequence to synthesize the message that is to be transmitted to the calling station.

The announcement apparatus shown on FIG. 17 is connected to a call in the manner already described, namely, with reference to both FIGS. 2 and 17, a calling TSPS trunk circuit, such as for example, 203 is connected over its T and R conductors, via the trunk and position links, to one of conductors 1704–1 through 1704–*n*. Let it be assumed that conductor 1704–1 is seized for this purpose. Once the connection to this conductor and the left side of announcement link 1703 is established, the SPC utilizes the call information it has stored and derived to determine the message that is to be transmitted to the calling station at this time. Accordingly, the SPC now controls the operation of the link controller 1705, by means of the CPD 232 and the 1/N address bus 239, so that the conductor 1704–1 is connected in a predetermined order and at predetermined times, via link 1703, to different ones of the announcement tracks 1 through $n$, over conductors 1702–1 through 1702–*n*. As already mentioned, each track contains the elemental portion of the message and the connection of conductor 1704–1 to the various tracks in sequence at the required times results in the transmission of the desired message to the calling station.

The elemental portions of the message recorded on each of tracks 1 through $n$ may comprise portions of words, such as syllables, words, or a plurality of words. The choice of the elements to be recorded on the various tracks depends upon the number of tracks available and the number of messages required. The greater the number of tracks, the smaller may be the length of the message elements on each track, and vice versa. The announcement apparatus and the equipment associated therewith for synthesizing messages is shown in diagrammatic form on FIG. 17, since its details comprise no part of the present invention and since equipment for performing this function is well known in the art. For example, the conventional time-of-day announcements provided by most telephone companies is synthesized by switching a call sequentially in a proper time relationship between various tracks of a recorded announcement machine. Further special synthesizing equipment, operating under control of a stored program processor, is shown in the IEEE Transactions on Communication Technology, vol. 13, No. 4, December 1965, pages 395–399, in an article entitled "An Automatic Telephone Intercept System," by G. F. Abbott and R. L. Bence.

The sole function of the announcement link 1703 is to interconnect a call with the plurality of tracks required to synthesize the message that must be reproduced. Although, conceptionally, this function could be performed by the switching network shown on FIG. 2A, the present disclosure shows the use of a separate link since, in many installations, the switching network on FIG. 2A might not have the capacity to perform its other functions as well as to operate at the speeds required for synthesizing the many messages required during periods of heavy traffic in the TSPS center. The provision of the announcement link relieves the network of FIG. 2A from the task of synthesizing announcements and leaves it free to perform its other functions as described in the Jaeger-Joel specification.

It is to be understood that the above-deccribed arrangements are but illustrative of the application of the principles of our invention. Numerous other arrangements may be devised by those skilled in the art without departing from the spirit and scope thereof. For example, the operation of our invention is disclosed with reference to the use of an MF receiver at the TSPS center for receiving the call information automatically outpulsed from the originating office, as well as for receiving the digits dialed by the calling party specifying the time at which the call is to be retried. The use of the MF receiver for this latter function would obviously require that the subset at the calling station be equipped with a pushbutton, rather than a rotary dial. The use of an MF receiver is not a limitation; and if desired, a dial pulse receiver can be used for receiving digits outpulsed in DP form from a local office in connection with the attempted establishment of the call, as well as for receiving in DP form the digits specifying the time at which the call is to be retried. A DP receiver suitable for performing this function in a TSPS center is shown in the J. A. Hackett-C. A. Sepulveda application, Ser. No. 402,532, filed Oct. 8, 1964.

At the present time, the cost of the memory required for operating a stored program processor is not insignificant. Since additional memory is required in practicing our invention, it is entirely possible that, until the cost of memory drops appreciably, it may be economically feasible to provide automatic call retry service only for toll calls whose initial period charge exceeds a predetermined amount. In other words, once it is determined that a call cannot currently be completed, the SPC may perform a screening operation and offer automatic call retry service to the calling subscriber only in the event that the initial period charge for his attempted call equals or exceeds a predetermined amount, such as for example, twenty-five cents. This screening is done by the program box designated P1 and entitled "Automatic Retry Screening." The information in this box together with the call information already stored within the SPC is utilized to determine whether or not the initial period charge for the call is sufficient to entitle the calling party to the use of the facilities provided in accordance with our invention.

The use of announcement equipment is not required in the practice of our invention. Since calling subscribers are not currently offered automatic call retry service, announcement equipment is shown herein as one possible means of advising them that facilities are available for retrying their calls. The use of the announcement equipment may be dispensed with whenever telephone subscribers become accustomed to the fact that call retry equipment is readily available. At such times, special tones or the like could be utilized, rather than the announcement equipment, to indicate the availability of this equipment.

The particular form of the equipment used, if any, to advise the calling party that this service is available is not important and neither is the particular form of the return signal from the calling station to the TSPS equipment. The only requirement is that the TSPS equipment must be provided with an indication that the customer desires automatic retry service, in the event it is not to be provided as a matter of routine on each and every call that is not completed on its initial attempt. The particular form of this indication is not important and it may comprise a switch hook flash, the dialing of a special code or both of these indications in combination with the dialing of information signifying the time at which the call is to be automatically retried.

As a further example of how our invention can be practiced, it is not necessary that the calling party perform a dialing operation in the event retry service is desired. Instead, the TSPS equipment including the SPC may automatically provide a fixed delay interval of five minutes (or any other given period) following which any call will be automatically retried. In this case, the calling party may also be provided with the option of having his calls retried at other than the standard retry interval of five minutes. He may dial digits specifying a retry delay interval of other than five minutes. Upon the reception of the digits, his call is retried at the time specified rather than after the elapse of the standard five-minute period.

It is to be understood that the above-described arrangements are but illustrative of the application of the principles of the invention. Numerous other arrangements may be devised by those skilled in the art without departing from the spirit and scope of the invention.

What is claimed is:

1. In a telephone switching system, means effective during the serving of a call request for determining that a connection cannot be completed from a calling to a called station, means effective upon said determination for specifying a time at which the call is to be retried, and means responsive to the arrival of said time for automatically retrying the establishment of said connection.

2. The invention of claim 1 in combination with further means responsive to said determination for transmitting to said calling station a signal indicating that said call connection cannot currently be completed to said called station.

3. The invention of claim 1 in combination with additional means effective upon said determination for registering a signal transmitted from the calling station requesting that the call is to be retried at a later time.

4. The invention of claim 3 wherein said means for registering includes means for receiving information from said calling station specifying the time that the call is to be retried.

5. The invention of claim 1 in which said means for specifying includes means effective subsequent to said determination for registering information transmitted from said calling station indicating the time at which the call is to be retried.

6. The invention of claim 1 in combination with means responsive to the arrival of said time for transmitting a signal to the calling station indicating that the call is about to be retried.

7. The invention of claim 1 in which said means for specifying includes means automatically operative upon said determination for providing a predetermined interval of delay following which said call is to be retried, means responsive to the receipt of a signal from said calling station for disabling said predetermined interval providing means, and means for registering information transmitted from said calling station indicating a subsequent time at which the call is be retried.

8. In a telephone system, means operable under control of a calling subscriber for attempting the extension of a connection from a calling to a called station, means effective when the called station is busy or does not answer for determining that said connection cannot currently be completed, means effective upon said determination for receiving a signal from said calling station requesting that the call be automatically retried, means for registering information received from the calling station indicating the time at which the call is to be retried, means responsive to the receipt of said information for timing the interval of delay following which the call is to be retried, and means effective upon the arrival of said time for automatically retrying the establishment of said connection.

9. The invention of claim 8 in combination with means responsive to said determination for transmitting to said calling station a signal indicating that said call connection to said called station cannot currently be completed.

10. The invention of claim 9 in combination with means effective upon the arrival of said time for transmitting a signal to the calling station indicating that the call is about to be retried.

11. The invention of claim 8 in combination with additional means effective upon said determination for computing the initial period charge for a call connection between said calling and called stations, means responsive to said computation for determinging whether said charge exceeds a specified minimum, and means effective for preventing the automatic retry of said connection if said charge does not exceed said minimum.

12. In a telephone system, means operable under control of a calling subscriber for attempting the extension of a connection from a calling to a called station, means responsive to the return from the forward end of said connection of either busy tone or ringing tone for a predetermined interval for determining that the connection cannot successfully be completed to the called station, means responsive to said determination for releasing the forward connection, means effective upon said determination for registering a signal received from said calling station requesting that the call be retried, means for specifying the time at which the call is to be retried, means for measuring the interval following which the call is to be automatically retried, and means effective upon the arrival of said time for controlling the establishment of the requested interconnection between the calling and called stations.

13. The invention of claim 12 wherein said means for controlling comprises additional means effective upon the arrival of said time for controlling the establishment of a connection to said calling station, and means effective upon an off-hook condition at said calling station for outpulsing forward the call information required to extend a connection to said called station.

14. The invention of claim 13 in which said means for specifying includes means for registering information from said calling station indicating the time at which the call is to be retried.

15. The invention recited in claim 14 in combination with means further responsive to said determination for transmitting an announcement to said calling station signifying that the call cannot currently be completed and that equipment is available for automatically retrying the call at a subsequent time.

16. The invention recited in claim 15 in combination with means effective upon the arrival of said time for transmitting an announcement to said calling station indicating that the call is about to be retried.

17. The invention of claim 12 in which said means for specifying includes means automatically operative for providing a fixed interval of delay following which each call is to be retried, means responsive to the receipt of a signal from said calling station for disabling said fixed interval providing means, and means for registering information transmitted from said calling station indicating the time at which the call is to be retried.

18. The invention recited in claim 17 in combination with means further responsive to said determination for transmitting an announcement to said calling station signifying that the call cannot currently be completed and that equipment is available for automatically retrying the call either at a subsequent time specified by the system or, at the caller's option, at a subsequent time specified by him, and additional means effective upon the arrival of said time for transmitting an announcement to said calling station indicating that the call is about to be retried.

19. In a call service center, a service trunk circuit having a first end connected to a local office outgoing trunk circuit and a second end connected to a toll office incoming trunk circuit, means responsive to the receipt by said service trunk circuit of a call from said local office for extending said call via its second end and said toll office to a called station, a switching network, means for connecting said service trunk circuit to said switching network, a ringing tone detector and a busy tone detector in said service trunk circuit, means including said detectors effective during the serving of said call and responsive to the return of busy tone or ringing tone for a predetermined interval from the forward end of said connection for determining that a connection cannot be successfully currently completed to the called station, means responsive to said determination for releasing the forward connection, means effective upon said determination for registering a signal received from the calling station requesting that the call be retried, digit receivers, means effective upon said determination for controlling the connection of said service trunk circuit and to one of said digit receivers via said network, means including said digit receivers effective for subsequently registering information transmitted from the calling station specifying the time at which the call is to be retried, said network being subsequently effective for disconnecting said receiver from said trunk circuit, means responsive to the receipt of said information for measuring the call interval following which the call is to be retried, and means effective upon the arrival of said time for automatically retrying said call.

20. The invention of claim 19 wherein said means for retrying comprises a delayed call trunk circuit connected over two separate paths to said tool office, means connecting said delayed call trunk circuit to said switching network, outpulsers, means effective upon the arrival of said time for controlling the connection via said network of one of said outpulsers to said delayed call trunk circuit, said outpulser being effective to outpulse to the toll office the information it requires to complete a connection to said calling station, means for detecting an off-hook condition at the calling station, and means for controlling said outpulser to outpulse forward to the toll office the information it requires to complete a connection to the called station, said network being subsequently effective to disconnect said outpulser.

21. The invention of claim 19 in combination with announcement apparatus, means further responsive to said determination for controlling the interconnection of said announcement apparatus with said service trunk circuit via said network, said apparatus being effective for transmitting an announcement to the calling station signifying that the call currently cannot be completed and that equipment is available for automatically retrying the call, said network being subsequently effective to disconnect said apparatus from said call.

22. The invention of claim 20 in combination with further means effective upon the arrival of said time for controlling the connection of said announcement apparatus via said network to said delayed call trunk circuit, said announcement apparatus being effective to transmit an announcement via said network and said delayed trunk circuit to the calling station indicating that the call is about to be retried.

23. In a telephone system, means for determining that a call connection cannot currently be extended from a calling to a called station, means effective upon said determination for registering call information received from said calling station with said information including data specifying a subsequent time at which said call is to be completed, means for timing the interval between the receipt of said information and the time specified by said data, and means responsive to the expiration of said interval for completing said call.

References Cited
UNITED STATES PATENTS

| | | |
|---|---|---|
| 3,363,063 | 1/1968 | Kandel et al. |
| 3,045,067 | 7/1962 | Nilsson et al. |
| 2,909,607 | 10/1959 | Nilsson et al. |

KATHLEEN H. CLAFFY, Primary Examiner

T. W. BROWN, Assistant Examiner